(12) United States Patent
Rittman et al.

(10) Patent No.: US 10,021,522 B2
(45) Date of Patent: Jul. 10, 2018

(54) TRACKING DEVICES, SYSTEMS AND METHODS USING PATCH PACKAGES WITH EMBEDDED ELECTRONIC CIRCUITS

(71) Applicant: Gopher Protocol, Inc., Perris, CA (US)

(72) Inventors: Danny Rittman, San Diego, CA (US); Aliza Schnapp, Beverly Hills, CA (US)

(73) Assignee: Gopher Protocol Inc., Santa Monica, CA (US)

( * ) Notice: Subject to any disclaimer, the term of this patent is extended or adjusted under 35 U.S.C. 154(b) by 0 days.

(21) Appl. No.: 15/344,619

(22) Filed: Nov. 7, 2016

(65) Prior Publication Data
US 2017/0195839 A1    Jul. 6, 2017

Related U.S. Application Data

(60) Provisional application No. 62/387,789, filed on Jan. 6, 2016.

(51) Int. Cl.
| | |
|---|---|
| *H04W 4/02* | (2018.01) |
| *H01Q 1/22* | (2006.01) |
| *H01Q 1/36* | (2006.01) |
| *H04W 4/50* | (2018.01) |
| *H01Q 7/00* | (2006.01) |
| *H01Q 21/06* | (2006.01) |

(52) U.S. Cl.
CPC .......... *H04W 4/023* (2013.01); *H01Q 1/2225* (2013.01); *H04W 4/50* (2018.02); *H01Q 7/00* (2013.01); *H01Q 21/061* (2013.01)

(58) Field of Classification Search
CPC ........ H04W 4/023; H01Q 1/2283; H01Q 1/36
See application file for complete search history.

(56) References Cited

U.S. PATENT DOCUMENTS

| | | | |
|---|---|---|---|
| 6,173,191 B1 * | 1/2001 | Jennings, III .......... | H01Q 1/246 455/277.1 |
| 6,211,781 B1 * | 4/2001 | McDonald ............ | G01S 13/878 340/505 |

(Continued)

OTHER PUBLICATIONS

International Search Report and Written Opinion dated Jan. 27, 2017 in related International Application No. PCT/US2016/060763.

*Primary Examiner* — Christopher M Brandt
(74) *Attorney, Agent, or Firm* — Eric L. Lane; Green Patent Law

(57) ABSTRACT

A tracking device for global tracking of objects is provided including a patch package comprised of a flexible material and an electronic circuit embedded within the patch package. The electronic circuit includes a controller, a secured basic input/output (BIOS) system, a memory unit, a radio unit, and an antenna. The radio unit and the antenna transmit the location of the tracking device. The antenna may be a wire antenna or a ball antenna. The flexible material may be sticky such that the tracking device may be affixed to an object. The electronic circuit may also include an affix sensor configured to determine whether the tracking device is affixed to and removed from an object. Methods of tracking objects using tracking device are also provided in which the tracking device is affixed to an object and a transmission is received from the electronic circuit providing location information of the tracking device.

20 Claims, 21 Drawing Sheets

(56) References Cited

U.S. PATENT DOCUMENTS

| | | | |
|---|---|---|---|
| 6,700,493 B1* | 3/2004 | Robinson | G08B 21/023 |
| | | | 340/539.1 |
| 9,278,182 B2 | 3/2016 | Edwards et al. | |
| 2003/0117282 A1* | 6/2003 | Copeland | G08B 13/2402 |
| | | | 340/572.7 |
| 2004/0178955 A1* | 9/2004 | Menache | A63F 13/06 |
| | | | 342/463 |
| 2007/0069895 A1* | 3/2007 | Koh | G06K 19/02 |
| | | | 340/572.1 |
| 2011/0068921 A1* | 3/2011 | Shafer | G06K 7/0008 |
| | | | 340/571 |
| 2011/0224915 A1* | 9/2011 | Hughes | A61B 5/0002 |
| | | | 702/19 |
| 2012/0098665 A1 | 4/2012 | Wyatt, Jr. et al. | |
| 2016/0259950 A1 | 9/2016 | Rittman et al. | |

* cited by examiner

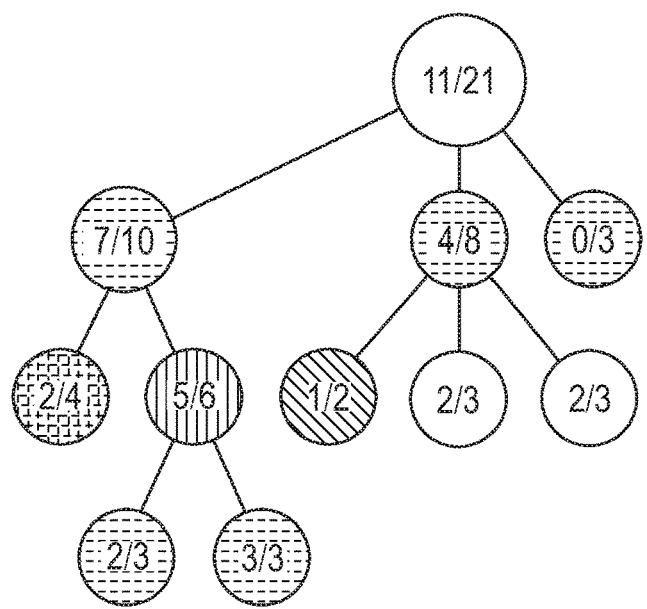
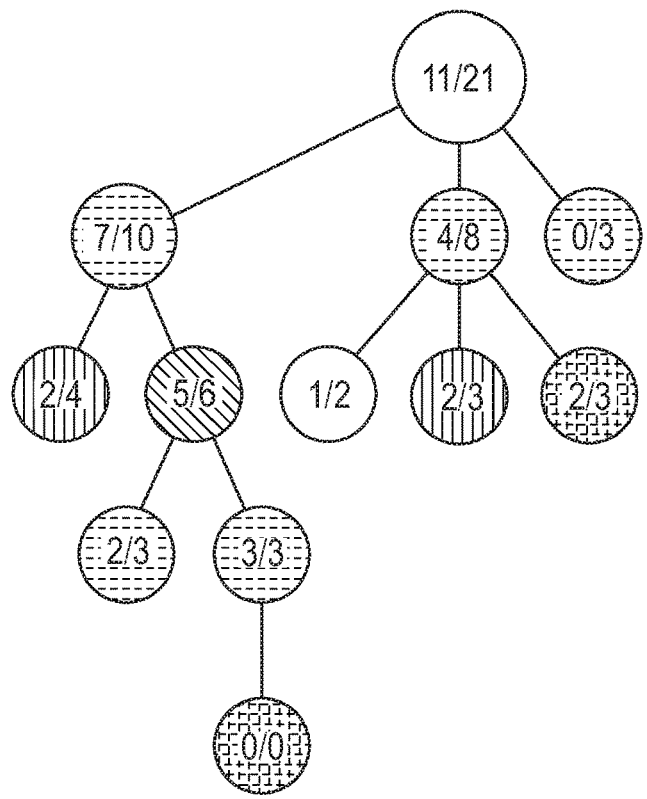
FIG. 17

TRACKING DEVICES, SYSTEMS AND METHODS USING PATCH PACKAGES WITH EMBEDDED ELECTRONIC CIRCUITS

CROSS-REFERENCE TO RELATED APPLICATION

This application is a non-provisional of and claims priority to U.S. Patent Application No. 62/387,789, filed Jan. 6, 2016, which is hereby incorporated by reference in its entirety.

FIELD

The present disclosure relates to global tracking devices, systems and methods using patch packages. The present disclosure further relates to electronic circuits embedded in patch packages.

BACKGROUND

Systems that locate, track, and monitor the status of people and valuable objects generally utilize or incorporate known technology, including, for example, Global positioning System (GPS) technology, inertial and non-inertial sensor devices, and signal analysis methods. However, existing systems have serious drawbacks that are based on battery power energy, antenna strength and effectiveness, available cellular services and satellite global position around earth.

For example, tracking GPS relies primarily on line-of-sight signal acquisition, for example, caves or certain terrain. In these locations, however, the line of sight of GPS satellites may be substantially obscured and GPS signals may be highly attenuated. As a result, GPS signals are typically weaker in these types of environments so GPS receivers have difficulty receiving GPS signals and calculating accurate position information.

Inertial tracking systems typically use readings from sensors such as gyroscopes and accelerometers to estimate the relative path of personnel and/or assets. Inertial systems, however, may accumulate large errors over time due to factors such as drift in sensor offsets, sensitivity, and measurement limitations of the sensors, as well as limitations of the location determining methods (e.g., algorithms) implemented by such systems.

Signal analysis methods that use signals of the same (or different) frequencies from different reference points to compute the location of personnel and/or assets may be unfeasible due to the need to install a number of reference devices at a particular tracking location (or scene), and may further have large instantaneous errors and outliers due to the multi-path effects of signals traveling through various building materials.

Due to these drawbacks, lost or stolen vehicles, personal valuables, and other objects often are not recovered quickly or successfully using existing tracking systems. Aircraft and watercraft may be lost and out of communication for extended periods of time. In addition, people in emergency situations may not be able to communicate their location to law enforcement authorities.

Therefore, there exists a need for a tracking system that provides a secure location signal from anywhere, even where there is no cellular network. There is also a need for a more powerful and effective miniature antenna structure for use with various wavelengths in smaller scales. Finally, there is a need for a communications system that can take advantage of global position and location information to provide real-time location identification and tracking for individuals, mobile devices, and other objects.

SUMMARY

The present disclosure, in its many embodiments, alleviates to a great extent the disadvantages of known tracking systems and devices by providing a tracking device including a package, also referred to as a "patch" or patch package, comprised of a flexible material and an electronic circuit embedded within the patch package. The patch package may be sticky so the tracking device can be affixed to any object or vehicle and may include a special microchip to work in conjunction with a mobile software application. A radio unit and antenna in the electronic circuit transmit the location of the tracking device. An affix sensor is configured to determine whether the tracking device is affixed to or removed from an object.

Disclosed tracking systems and devices, including patches or patch packages can be affixed to any object, mobile or static, to track the object's location anywhere on Earth. The electronic circuit communicates with other similar working patches via a separate, secured, and private network. Upon affixing the patch on an object, the circuit is turned on, after which the electronic circuit regularly transmits an identification signal to identify the device's geographical location worldwide in preset time intervals. The patch works in conjunction with a software application to provide tracking function operations via map and on-Earth coordinates. The system may include its own power source.

Exemplary embodiments of a tracking device also perform an emergency feature. Users will be able to register the Patch ID on mobile apps of selected relatives and friends. In the event of an emergency situation, one would simply peel the patch off. Upon removing the patch, it operates in a constant transmission mode, sending emergency signals. The patch also alerts the user's friends and family about the user's location. No GPS or conventional network is needed.

Exemplary embodiments of a tracking device comprise a patch package and an electronic circuit embedded within the patch package. The patch package is comprised of a flexible material. The electronic circuit includes a controller, a secured basic input/output (BIOS) system, a memory unit, a radio unit, and an antenna. In exemplary embodiments, the antenna is a wire antenna. The radio unit and the antenna transmit the location of the tracking device. In exemplary embodiments, the flexible material is sticky such that the tracking device may be affixed to an object. The electronic circuit may further comprise an affix sensor configured to determine whether the tracking device is affixed to or removed from an object. The electronic circuit may also include a process subsystem, a control block, a crypto-block, and an interconnect communicatively connecting the process subsystem to the control block and the crypto-block.

In exemplary embodiments, the antenna is a ball antenna. Disclosed metal ball structure antennae relate generally to wireless transmission devices, including wireless broadband radio devices, transceivers, CB Radio, HAM Radio and any other RF based device. Disclosed ball antenna structures may be used within wireless broadband devices that are configurable as point-to-point or point-to-multipoint RF devices.

In exemplary embodiments, the ball antenna may comprise at least one ball structure in a first plane. The ball antenna may also comprise a plurality of radiating elements in communication with the at least one ball structure, and each of the plurality of radiating elements is located in a plane different than the first plane. In exemplary embodiments, the ball antenna further comprises a plurality of ball structures in communication with the plurality of radiating elements. The ball antenna may also include a plurality of feed lines, each feed line connecting two or more of the plurality of radiating elements such that the plurality of radiating elements form a network fed by a common connection point. The ball structure may comprise a plurality of ball structures encircling a centrally located ball structure. In exemplary embodiments, the at least one ball structure defines a cut spiral structure. In exemplary embodiments, the at least one ball structure has a cage structure.

Exemplary methods of tracking an object are provided comprising affixing a tracking device to an object and receiving a transmission from the electronic circuit where the transmission provides location information of the tracking device. The tracking device includes a patch package comprised of a sticky material and an electronic circuit embedded within the patch package. The electronic circuit includes a controller, a secured basic input/output (BIOS) system, a memory unit, a radio unit, and an antenna. In exemplary embodiments, the electronic circuit further comprises an affix sensor. Exemplary methods comprise receiving a transmission from the electronic circuit when the tracking device is removed from the object. In exemplary embodiments, the antenna is a wire antenna. In exemplary embodiments, the antenna is a ball antenna. In exemplary embodiments, the ball antenna comprises at least one ball structure in a first plane and a plurality of radiating elements in communication with the at least one ball structure, and each of the plurality of radiating elements is located in a plane different than the first plane. Exemplary embodiments further comprise calculating a geographical location of the tracking device using triangulation.

Electronic circuits of any form may be embedded within the patch package, and an exemplary circuit has an inner hardware-based access barrier or firewall that establishes a private unit disconnected from a public unit, the public unit being configured for a connection to a public network of computers including the internet. In addition, the private unit is configured for a separate connection to at least one non-internet-connected private network for administration, management, and/or control of the computer and/or microchip, locally or remotely, by either a personal user or a business or corporate entity. The microchip communicates, through a secured, encrypted, private network with all other same type and others microchips on mobile devices, worldwide.

Exemplary electronic circuits for use in disclosed tracking systems, devices, and methods comprise an electronic circuit or microchip with a secured basic input/output (BIOS) system, ROM and RAM memory that is working with smartphone software application and communicates with other microchips via a separate, secured, and encrypted private network, worldwide. The electronic circuits or microchips may include a network connection for communicating with other microchips through public network of computers and mobile devices including the internet. The microchips or electronic circuits may be located within other mobile microchips or on a device's electronic board as a separated microchip.

An inner, private hardware-based access barrier or firewall may be located within the unit and communicatively secure the connection between the microchips via encrypted protocol. The protected private unit may include at least one microprocessor unit and a system BIOS located within a flash memory. The microchip can work in conjunction with a mobile software application to provide computing power and heuristic based functional operations. The inner barrier or firewall may comprise a bus with an on/off switch controlling the communication input and output systems.

Disclosed tracking systems, devices, and methods utilize an electronic circuit and/or a microchip for emergency communication, beacon, location identification and tracking on mobile devices, in real time. The user may enter his or her medical information. The system can record biometric information such as the user's fingerprint and eye print for identification purposes. The system can enable GPS-based emergency communications and a location tracking feature. The system can also provide an SOS button. Once activated, the system transmits a periodic emergency signal every designated time period, identifying the mobile device location. The system can transmit the user's medical information to a remote center for professional assessment.

In exemplary embodiments, the system includes an integrated circuit unit that works in conjunction with a mobile software application. The system enables tracking of the mobile device via a unique sequence code assembled within the electronic circuit or microchip. The system may communicate directly with satellite networks and works in areas that are out of cellular/wireless range. The mobile software executed on the mobile device sends a secured, encrypted, private code sequence to the integrated circuit to activate the emergency procedure for locating and tracking. The electronic circuit or microchip directly communicates via satellite with all the other disclosed circuits or microchips within mobile devices, worldwide, to provide the emergency communication, location identification and tracking feature.

In exemplary embodiments, an electronic circuit comprises a process subsystem including a compliance circuit, a microprocessor, an interrupt controller, and a bridge. The electronic circuit further comprises a control block including a clock manager, a reset manager, a power manager, and a system control. The electronic circuit also has a crypto-block including a master sub-block, a slave sub-block, a direct memory access circuit, a packet buffer, and a crypto-engine. An interconnect communicatively connects the process subsystem to the control block and the crypto-block. The electronic circuit may further comprise a memory controller communicatively connected to the interconnect. The electronic circuit may further comprise a phase locked loop and an oscillator circuit communicatively connected to the control block.

In exemplary embodiments, a first network connection connects to a public network, and a second network connection connects to a private network. In exemplary embodiments, the second network connection is a wired connection. The barrier may communicatively connect the private unit and the public unit. The barrier may include a signal interruption mechanism. In exemplary embodiments, the signal interruption mechanism is a bus having an on/off switch controlling communication input and output.

In exemplary embodiments, the private unit further includes a central controller having a master control unit. Communications between the private unit and the public unit may be controlled via the private network. Advantageously, the electronic circuit can be simply and effectively connected to the internet and communicate with all other electronic circuits via private, secured, and encrypted network, providing the ultimate computing power. In exemplary embodiments, the master control unit controls at least one operation executed by the second microprocessor. Any or all of the private units can be administered, managed, and/or controlled by a personal or corporate computer/ microchip through the use of one or more separate and secured, encrypted internet based networks. By thus avoiding any connection whatsoever to the generally insecure public internet, connection of the computer's private unit to the secure private network allows for all the well-known speed, efficiency and cost effectiveness of network connection while still completely avoiding the incalculable risk of internet connection.

Accordingly, it is seen that global tracking devices, systems, and methods are provided which allow emergency location and tracking ability. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures do not show every piece of equipment, nor the materials, configurations, and directions of the various circuits and communications systems.

Figure 1:
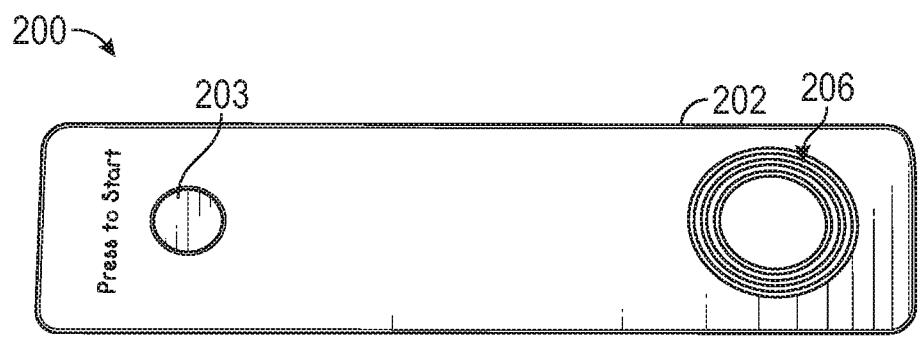
FIG. 1 is a perspective view of an exemplary embodiment of tracking device in accordance with the present disclosure.
Figure 2A:
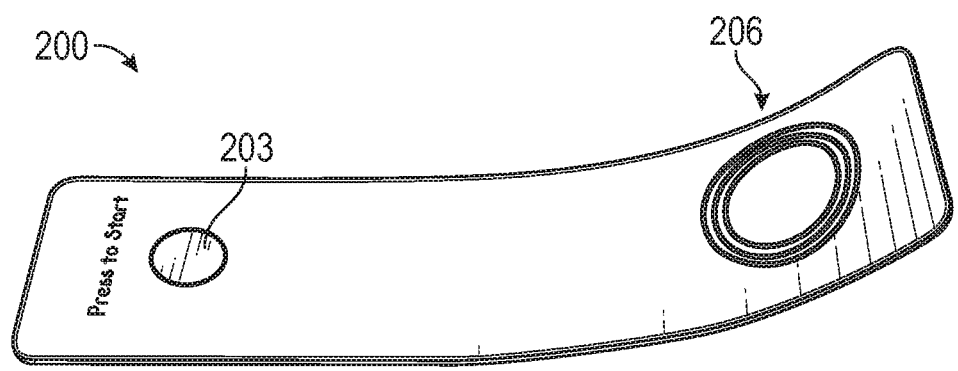
FIG. 2A is a perspective view of an exemplary embodiment of a tracking device in accordance with the present disclosure.
Figure 2B:
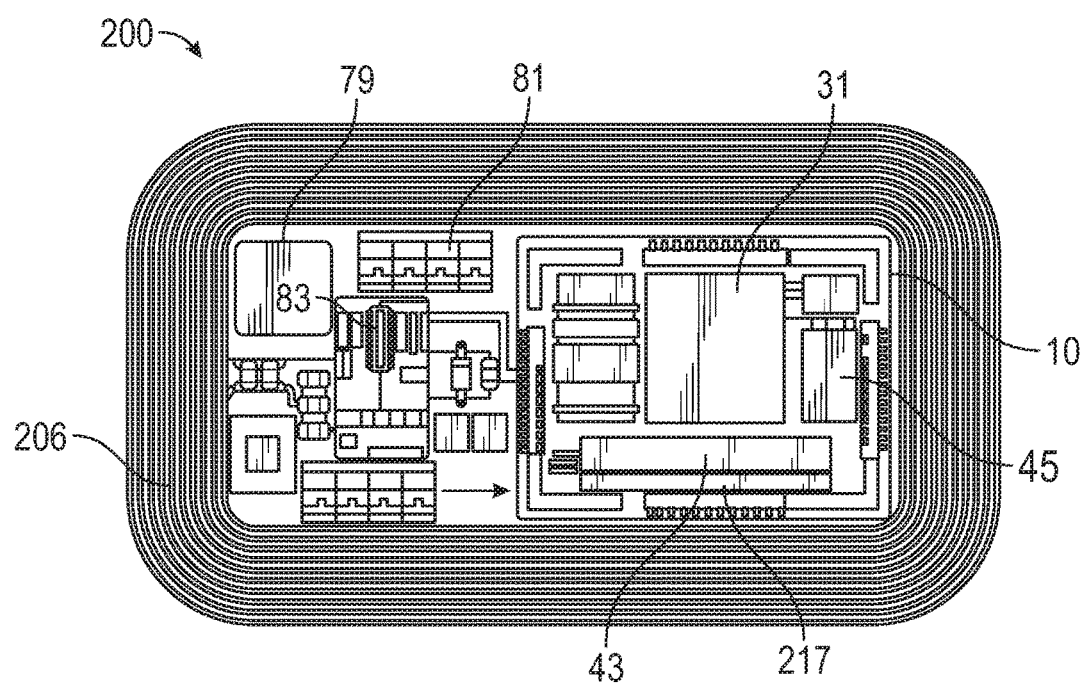
FIG. 2B is an exploded view of an exemplary embodiment of a tracking device in accordance with the present disclosure

With reference to FIGS. 1-2B, exemplary embodiments of a tracking device 200 comprise a package 202 with an electronic circuit 10 embedded therein. The package 202, also referred to as a "patch" or patch package, may be made of or coated with a sticky material so its outer surface is sticky. The patch package 202 is made of a flexible and lightweight but rugged material such as a polymer-based or plastic material or any other material that provides both flexibility and strength. In exemplary embodiments, the patch package 202 is made of a material that is waterproof and otherwise weatherproof so it is not damaged in inclement weather and protects the electronic circuit 10 and other electronics contained in the device 200.

Figure 4:
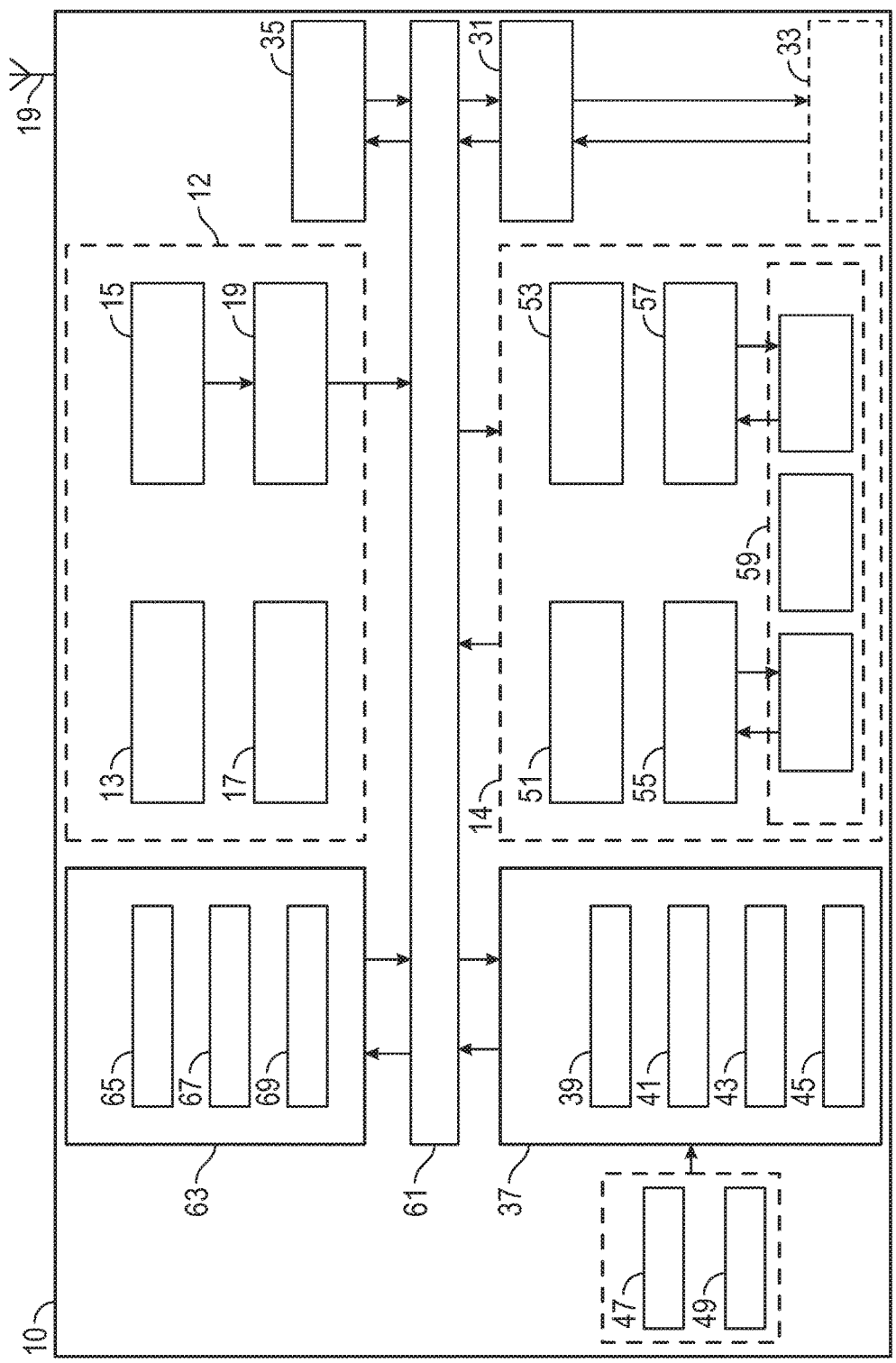
FIG. 4 is a schematic of an exemplary embodiment of an electronic circuit in accordance with the present disclosure.

The electronic circuit 10 (also referred to as an integrated circuit or microchip) housed in the patch package 202 can be seen in FIG. 4. The electronic circuit can be of any form, e.g., a personal computer, a mobile device such as a smartphone, or a microchip. Any type of electronic circuit or microchip could be used and configured as described herein, including but not limited to, a low noise amplifier (LNA) type circuit, a customized voltage controlled oscillator (VCO) type circuit, a phase locked loop (PLL) type circuit, a low pass filter (LPF) type circuit, a notch filter type circuit, and/or a serializer and de-serializer (SERDES) type circuit.

Referring to FIGS. 2B and 4, an exemplary electronic circuit 10 comprises a process subsystem 12 including a compliance circuit 13, a microprocessor 15, an interrupt controller 17, a power manager and a bridge 19. The compliance circuit 13 may be a Debug or joint test action group circuit. The microprocessor 15 may be a Cortex Mx circuit. In exemplary embodiments, the interrupt controller 17 is a nested vectored interrupt controller. The bridge 19 may be an automatic half barrier (AHB-AXI) circuit. The electronic circuit 10 may further comprise a control block 37 including a clock manager 39, a reset manager 41, a power manager 43, a system control 45, and may include a GPS unit 79 and/or a mesh unit 81, as well as a radio unit 83. The electronic circuit may also have a cryto-block 14 including a master sub-block 51, a slave sub-block 53, a direct memory access circuit 55, a packet buffer 57, and one or more crypto-engines 59.

In exemplary embodiments, an interconnect 61 communicatively connects the process subsystem 12 to the control block 37 and the crypto-block 14. The interconnect circuit 61 serves as a general interface to the various sub-blocks of the electronic circuit 10. The electronic circuit 10 may include one or more network connections that can communicatively connect the electronic circuit to a public network of computers, which could be linked by the internet. One of the network connections can communicatively connect the electronic circuit 10 to a private network of computers, separate and distinct from the public network. The network connections can be wireless or wired connections. For additional security, a private network connection may be a wired connection to the private network, and one or more sub-blocks of the electronic circuit 10 may also be configured so they cannot connect to the internet. In exemplary embodiments, the one or more sub-blocks of the electronic circuit 10 are not connected to the internet and other sub-blocks are connected to the internet.

The electronic circuit 10 may include a memory unit/controller 31 comprised of a memory controller circuit. An external memory interface 33 may be in communication with the memory controller 31 via a memory interface port. The memory interface can be of SD, Flash or other volatile memory access. There may also be an on-chip RAM 35 comprised of on-chip RAM IP. In exemplary embodiments, the electronic circuit 10 may further comprise an antenna 206 embedded within the electronic circuit and/or located outside the electronic circuit and communicatively connected to the electronic circuit.

In exemplary embodiments, a control block 37 includes a clock manager 39, which may be comprised of a clock manager circuit, to set the internal clock rate and pace. A reset manager 41, or clock reset circuit, may also be in the control block 37. A power manager 43 in the control block 37 automatically controls the unit's power. The system control 45 uses control logic to synchronize between the system's parts and I/O devices. A phase locked loop 47 to maintain certain frequency and an oscillator circuit 49 may be in communication with the control block 39.

In exemplary embodiments, the crypto-block 14 includes a master advanced extensible interface 51. The master advanced extensible interface 51 is the master sub-block. A slave advanced extensible interface 53 may also be provided for the encryption block. This is the slave sub-block. The crypto-block 14 may also include a direct memory access circuit 55, which enables fast, immediate direct access to memory when necessary. In exemplary embodiments, a packet buffer 57 serves as a register to store packets of data for the memory. A crypto engine 59 provides the private communication protocol encryption at 512 or 1024 bit. Exemplary embodiments may include certain peripherals 63 in communication with the interconnect 61 of the electronic circuit 10. Such peripherals could include a general-purpose input/output 65, an L2 GPS frequency circuit 67, and/or a single PORT interface 69 serving as a standard PORT to connect with other devices.

Exemplary electronic circuit architecture may be arranged to have some forms of a public unit and a private unit, as described in more detail in co-pending U.S. patent application Ser. No. 15/015,441, which is hereby incorporated by reference in its entirety. A barrier may be located between the public unit and the private unit. The public unit may include a network connection that can communicatively connect the electronic circuit 10 to a public network of computers, which could be linked by the internet. A second network connection may be located within the private unit. The second network connection can communicatively connect the electronic circuit 10 to a private network of computers, separate and distinct from the public network. The network connections can be wireless or wired connections. For additional security, the second network connection may be a wired connection to the private network, and the private unit may also be configured so it cannot connect to the internet. In exemplary embodiments, the private unit is not connected to the internet and the public unit is connected to the internet.

A barrier may be located between the public and private units, sub-blocks, or groups of sub-blocks. It should be noted that the barrier is not necessarily located physically between the two units, sub-blocks, or groups of sub-blocks. Rather, it stands between them for communication purposes, separating the private unit from the public unit for security while at appropriate times serving as an interconnect to communicatively connect the two units. The barrier may also separate the first and second network connections. More particularly, the barrier may be an inner hardware-based access barrier or inner hardware-based firewall. An exemplary barrier has a signal interruption mechanism to prevent communications between the private and public units, sub-blocks, or groups of sub-blocks when necessary or desirable. In exemplary embodiments, the signal interruption mechanism is a bus having an on/off switch that controls communication input and output.

The signal interruption mechanism may be a secure, out-only bus or equivalent wireless connection. In general, the secure control bus may be wired, wireless or channel communication. In exemplary embodiments, the private and public units, sub-blocks, or groups of sub-blocks may also be connected by an in-only bus (or equivalent wireless connection) that includes a hardware input on/off switch or equivalent signal interruption mechanism, including an equivalent circuit on a microchip or nano-chip (or equivalent wireless connection). In another exemplary embodiment, the private and public units, sub-blocks, or groups of sub-blocks may be connected by an output on/off switch or microcircuit or nano-circuit equivalent on the secure, out-only bus (or equivalent wireless connection) to secure and encrypt the embedded electronic circuit or microchip communication protocol.

In exemplary embodiments, the private unit of the electronic circuit or microchip includes a private microprocessor and a system BIOS. The system BIOS may be located in flash or in a non-volatile memory. In exemplary embodiments, the memory containing the system BIOS is located in a portion of the electronic circuit or microchip protected by the inner hardware-based access barrier or firewall.

In exemplary embodiments, a private unit of an electronic circuit could comprise an outer private unit, an intermediate more private unit, and an innermost private unit. The protected private unit of the electronic circuit or microchip could include a central controller, including a master controlling device or a master control unit. In exemplary embodiments, the master controlling device comprises a master microprocessor, core or processing unit configured for general purposes.

Similarly, one or more public units, sub-blocks, or groups of sub-blocks of the electronic circuit 10 include a public microprocessor. This microprocessor is separate from the barrier. The public microprocessor may be configured to operate as a general-purpose microprocessor. In exemplary embodiments, the public unit of the electronic circuit or microchip includes a plurality of microprocessors or processing units or cores, including but not limited to, 2, 4, 8, 16, 32, 64, 128, 256, 512, or 1024. The master controlling device may include a non-volatile memory such as RAM and/or ROM memory, and the electronic circuit 10 may also include a re-writable flash memory. Volatile memory like flash that has read/write ability can function as an inexpensive read-only memory (ROM) when located in the private unit because it can be protected by an access barrier or firewall against writing. Furthermore, it can even be protected against unauthorized reading, unlike ROM. Moreover, it can be written to when authorized by the central controller to update an operating system or download an app, for example, again unlike ROM. In exemplary embodiments, an integrated, hybrid, LOOP based antenna is embedded within the microchip and outside the microchip.

Figure 3A:
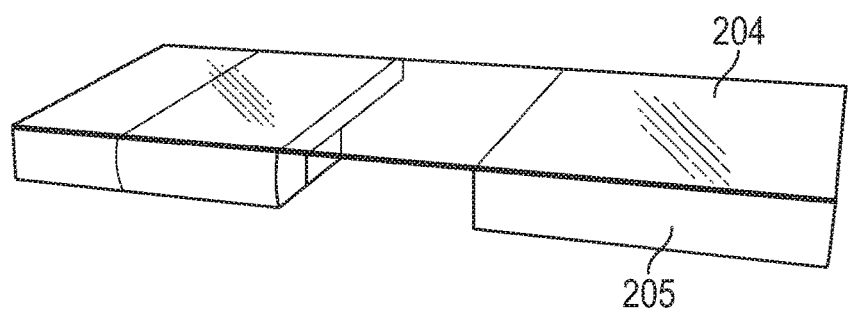
FIG. 3A is a perspective view of an exemplary embodiment of an affix sensor in accordance with the present disclosure.
Figure 3B:
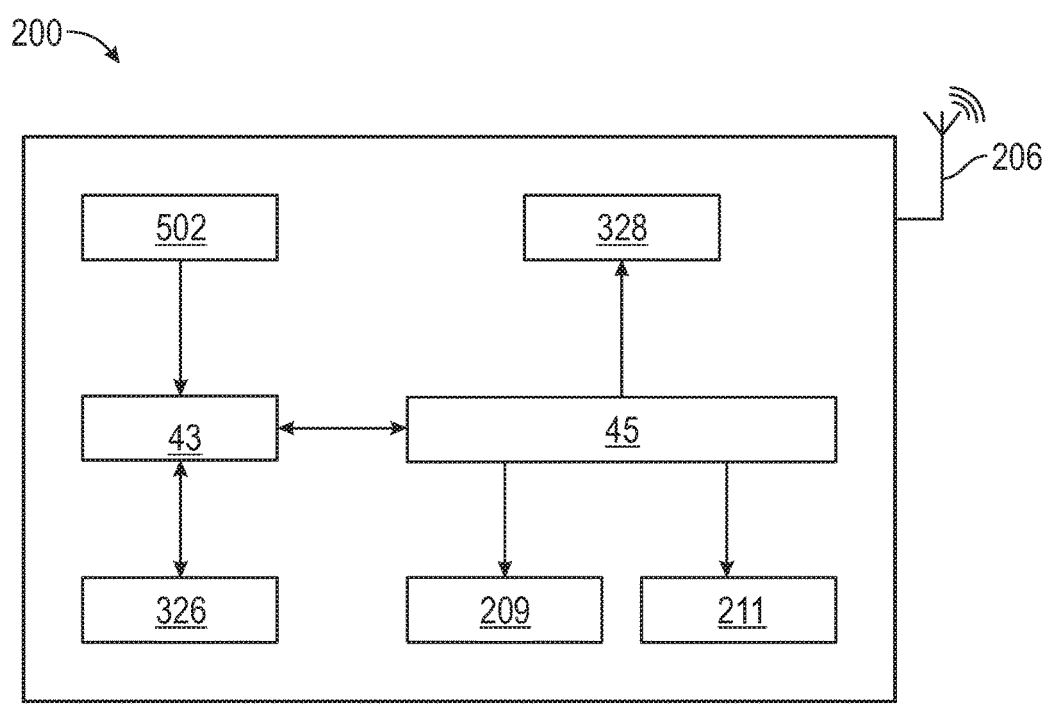
FIG. 3B is a schematic of an exemplary embodiment of an affix sensor system in accordance with the present disclosure.

The stickiness of the package 202 advantageously serves to enable the tracking device 200 to be affixed to an object as a patch product which can track the object anywhere. As described in more detail herein, when activated by pressing the start button 203, the electronic circuit 10 within the tracking device 200 transmits signals to enable tracking of the device's location anywhere on Earth. As best seen in FIGS. 3A and 3B, an affix sensor 204 may be provided with the tracking device 200. The affix sensor 204 is an advanced circuitry including an affix circuit 217 that controls the device's mounting and removal responses and may be integrated with the electronic circuit 10 or a separate component in communication with the electronic circuit 10.

Advantageously, the affix sensor 204 determines whether the tracking device 200 is affixed to the object to be tracked, and in exemplary embodiments the tracking device automatically turns on when affixed to an object. In exemplary embodiments, the "peel-and-stick" sensor system includes an adhesive 205 to stick to an object and pressure sensors 211 and conductivity sensors that detect application to the object and start the device's operation. It will stay on that object for the rest of the device's life and, once attached to an object, an internal clock starts to work. The clock has several tasks, one of which is determining the device's lifetime. Advantageously, the affix sensor can also determine if the device 200 gets removed from the object.

Figure 5:
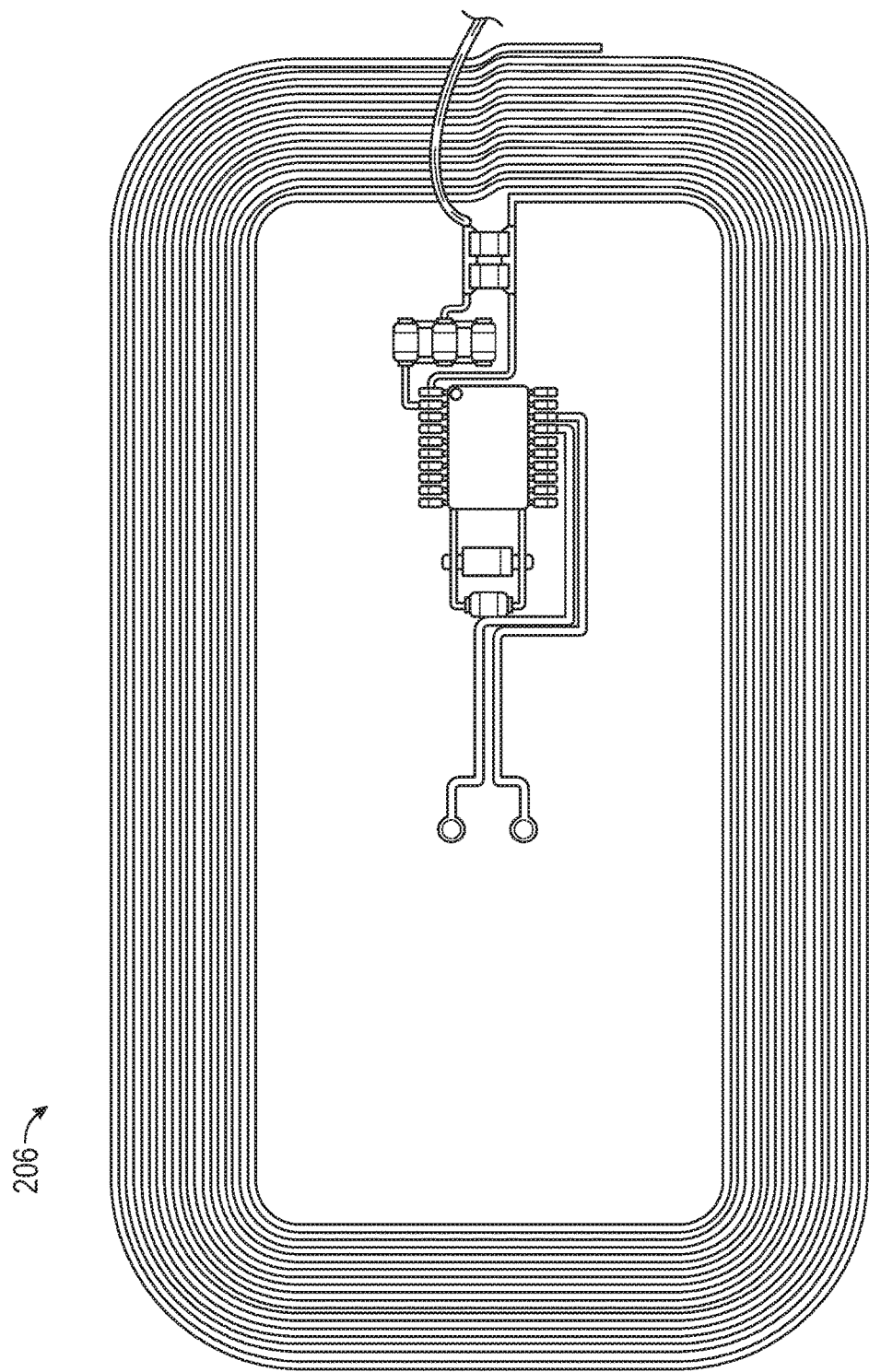
FIG. 5 is a top view of an exemplary embodiment of an antenna in accordance with the present disclosure.

As shown in FIGS. 1 and 2, the tracking device 200 also includes an antenna 206 to facilitate communications. More particularly, the tracking device 200 may include an antenna 206 and control circuitry configured to control transmission and receipt of broadband information to and from the antenna 206. Antenna 206 may be integrated with the electronic circuit 10 or be a separate component in communication with the electronic circuit 10. The antenna may be any form or type of antenna, and is shown in FIG. 5 as a wire antenna 206. As described in more detail herein, the antenna may be a ball antenna. The ball-based structure advantageously provides more power in a miniature antenna structure for use with various wave lengths in smaller scales.

Referring to FIGS. 6-14, exemplary embodiments of a ball antenna 306 will now be described. The tracking device 200 may include an array ball structure antenna 306 and control circuitry configured to control transmission and receipt of broadband information to and from the antenna 306. In general, an array ball antenna, which may also be referred to as a ball antenna, patch array antenna or patch antenna, may be formed of a plurality of antenna radiating elements each having a radiating surface. The metal ball antenna arrays described herein may also be configured and/or referred to as planar antennas or planar array antennas. The control circuitry of the wireless transmission devices may be adapted to operate with an array metal ball structure antenna using a layered printed circuit board that minimizes impedance mismatch.

Figure 6:
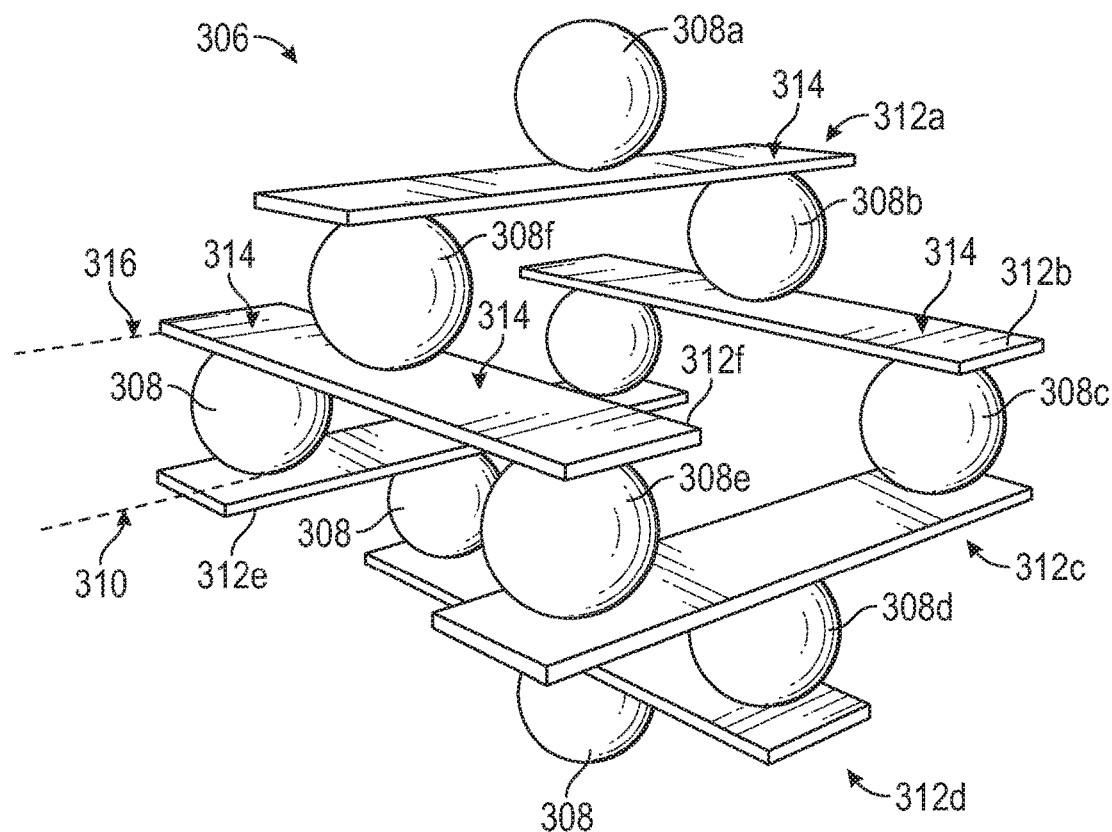
FIG. 6 is a perspective view of an exemplary embodiment of a ball antenna in accordance with the present disclosure.
Figure 7:
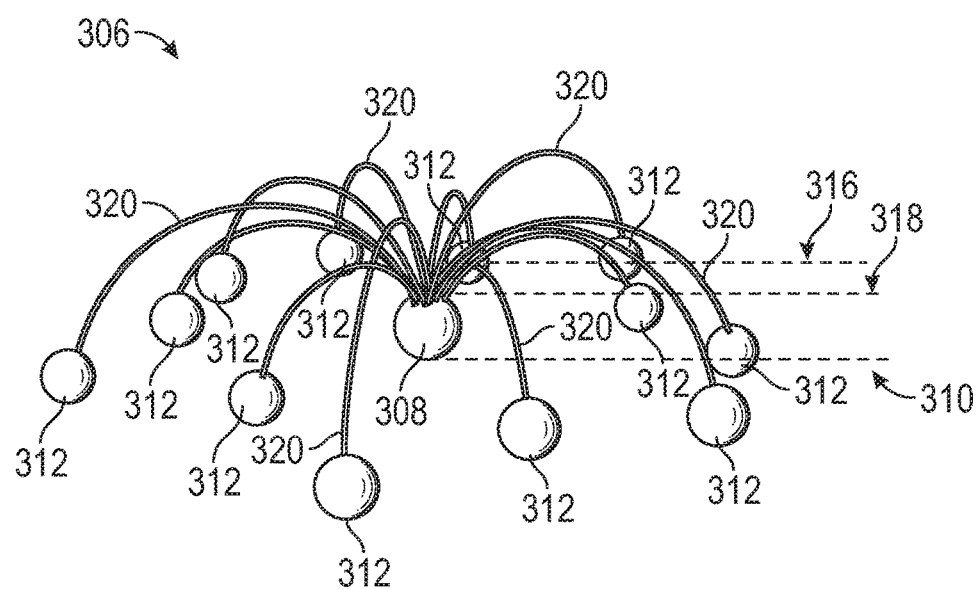
FIG. 7 is a perspective view of an exemplary embodiment of a ball antenna in accordance with the present disclosure.

As shown in FIG. 6, exemplary embodiments of a ball-based structure antenna 306 comprise at least one ball structure 308 situated in a first plane 310 and a plurality of antenna radiating elements 312 extending in another plane, which may be different from the first plane 310 of the ball structure 308. The ball structure 308 may be made of metal, and multiple metal balls be connected to one another via thin wires, thereby creating a ball array that functions as an antenna. In exemplary embodiments, one or more of the antenna radiating elements 312 has a radiating surface 314 extending in a second plane 316 above the first plane 310. The antenna radiating elements 312 may extend in the same plane as each other or in different planes from one another and may be of various shapes and surface areas. As best seen in FIG. 7, one or more of the antenna radiating elements 312 may be in the form of a ball structure as well. Exemplary antennae structure may have a third plane 318 between the first plane 310 and the radiating surfaces 314, which also may be in the form of a ball structure. In exemplary embodiments, the surface areas of the radiating surfaces 314 of the radiating ball structures vary relative to each other. The degree of variance can itself vary depending on the application, and in exemplary embodiments, is about 10% of an average circular surface area of the radiating surfaces 314 of the ball structures 308.

Figure 8:
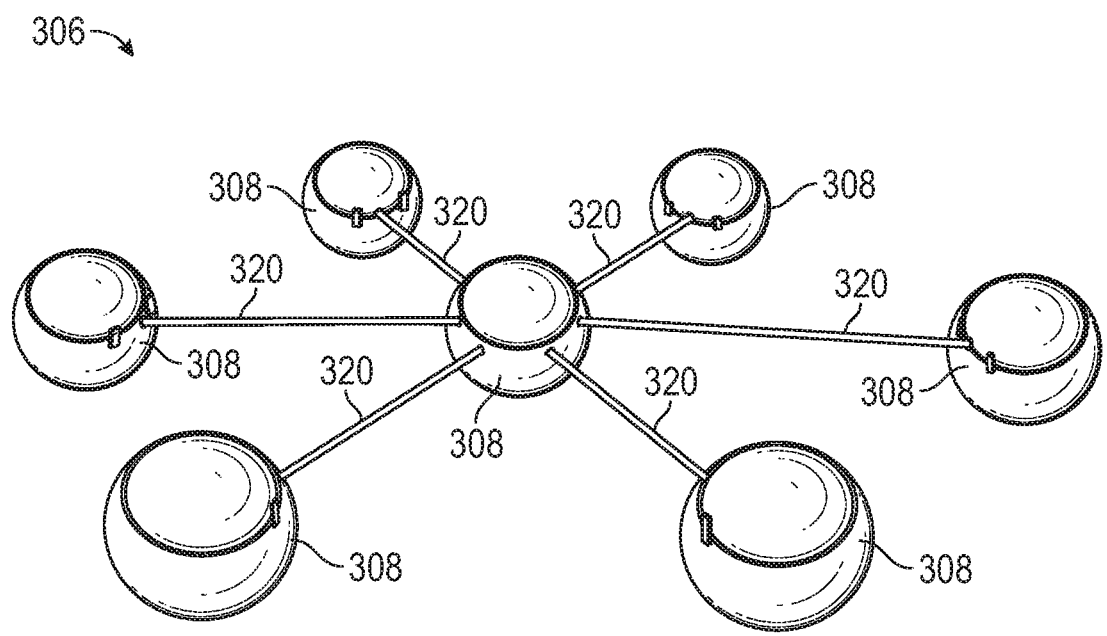
FIG. 8 is a perspective view of an exemplary embodiment of a ball antenna in accordance with the present disclosure.
Figure 9:
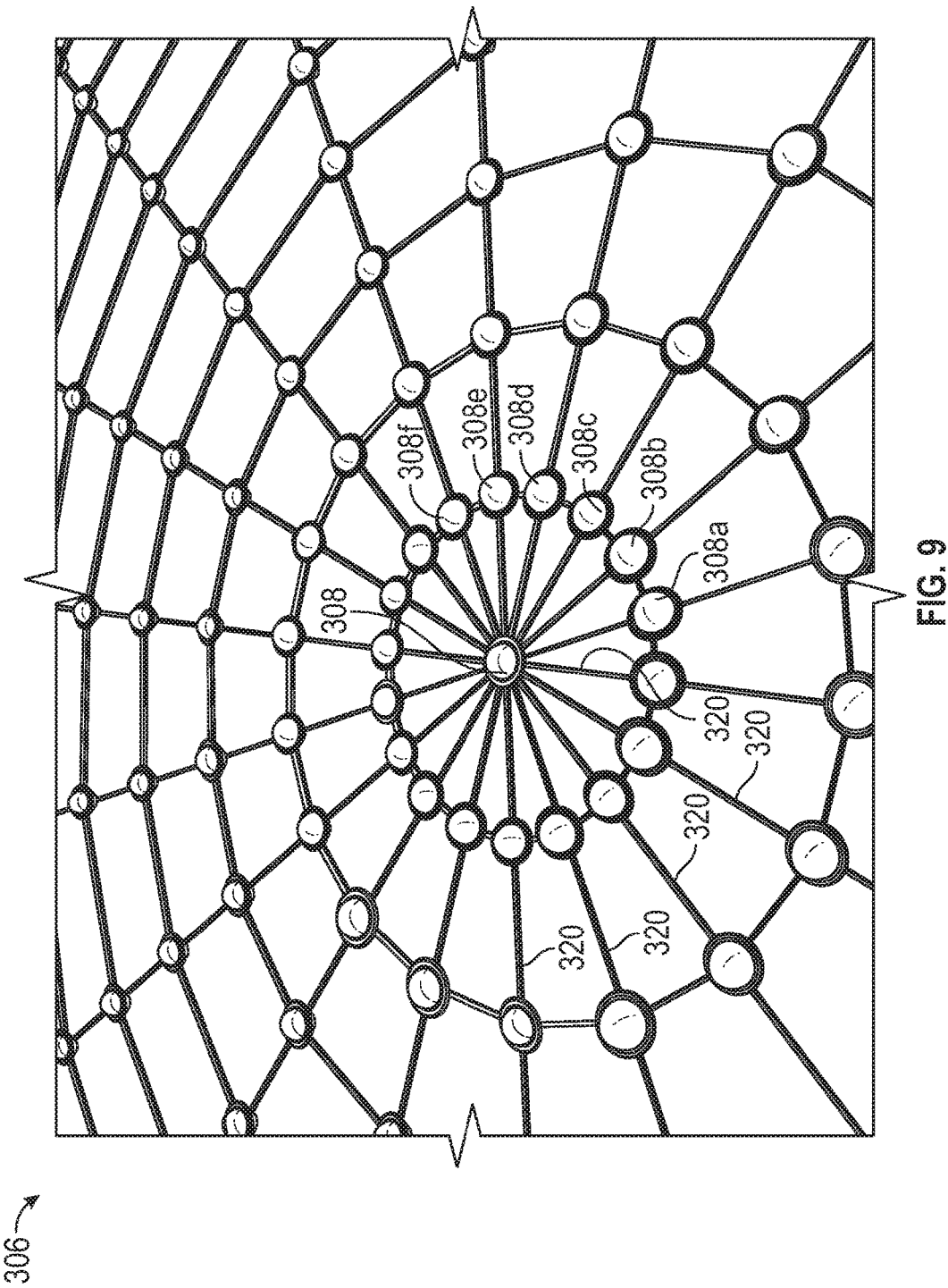
FIG. 9 is a perspective view of an exemplary embodiment of a ball antenna in accordance with the present disclosure.

With reference to FIGS. 7-9, embodiments of the ball structure antenna 306 may also have a plurality of feed lines 320. The feed lines 320 may extend in various planes. In exemplary embodiments, each feed line 320 extends in the third plane 318 between two or more of the antenna radiating elements 312 to connect the antenna radiating elements 312 to each other. Advantageously, as shown in FIG. 8, such connections enable the plurality of radiating elements 312 to form a network that is fed by a common connection point. In exemplary embodiments, illustrated in FIG. 6, the plurality of antenna radiating elements 312 and the plurality of feed lines 320 are part of a single ball 308 in which two or more perimeter points of each antenna radiating element 312 are connected through two or more slant feed lines 322 to the plurality of feed lines 320 in the third plane 318. The width of the slant feed lines 322 may narrow from the antenna radiating element 312 to the plurality of feed lines 320.

As illustrated in FIGS. 6-9, the ball antenna 306 may have a plurality of ball structures 308a, 308b, 308c, 308d, 308e, 308f, etc., together with the radiating elements 312a, 312b, 312c, 312d, 312e, 312f, etc. In exemplary embodiments, each of the ball structures 308a-n is in communication with at least one of the plurality of radiating elements 312a-n. A ball structure 308 may communicate with a respective radiating element 312 and with other ball structures 308 via its respective radiating element 312. FIG. 8 shows an exemplary "Center Ball" antenna structure. This type of antenna design with all elements compactly arranged in the same plane advantageously increases overall performance and enables sufficient software and hardware support for radio and other communications systems in smaller scales. Another exemplary "Center Ball" antenna structure is illustrated in FIG. 7. This type of antenna structure may be used in larger dimension antennas and increases performance.

An exemplary ball array structure having a plurality of ball structures and radiating elements located in a plurality of planes is shown in FIG. 6. This type of ball-based antenna design advantageously fits miniaturized antenna structures and is efficient for medium to high wavelengths. In exemplary embodiments, a ball structure 308 is located between two radiating elements 312 such that the two radiating elements 312 are in different planes separated by the ball structure 308. The space between a first 310 and second plane 316 provided by the ball structure may be any distance, and in exemplary embodiments, is about 10-20 millimeters provided by a ball structure 308 that is about 10-20 millimeters in diameter.

Similarly, the third plane 318 may be located above the second plane 316 and may be separated from the second plane 316 by a distance of about 10-20 millimeters due to a ball structure having a diameter of about 10-20 millimeters. Alternatively, the third plane 318 might be located below the first plane 310 and separated from the first plane by a distance of about 10-20 millimeters due to a ball structure having a diameter of about 10-20 millimeters. It should be noted that any number of different planes could be utilized in various configurations of ball structures and radiating elements.

Figure 10:
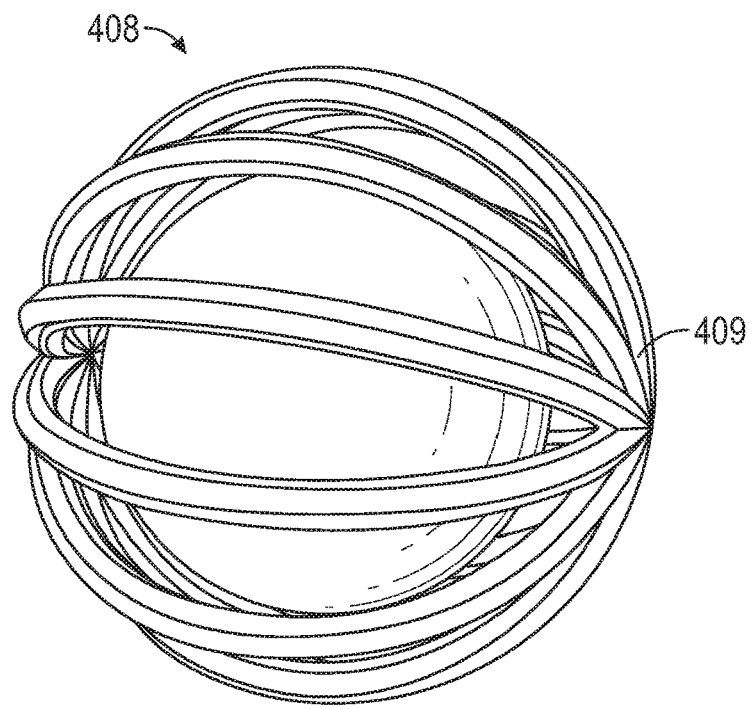
FIG. 10 is a perspective view of an exemplary embodiment of a ball antenna structure in accordance with the present disclosure.
Figure 11:
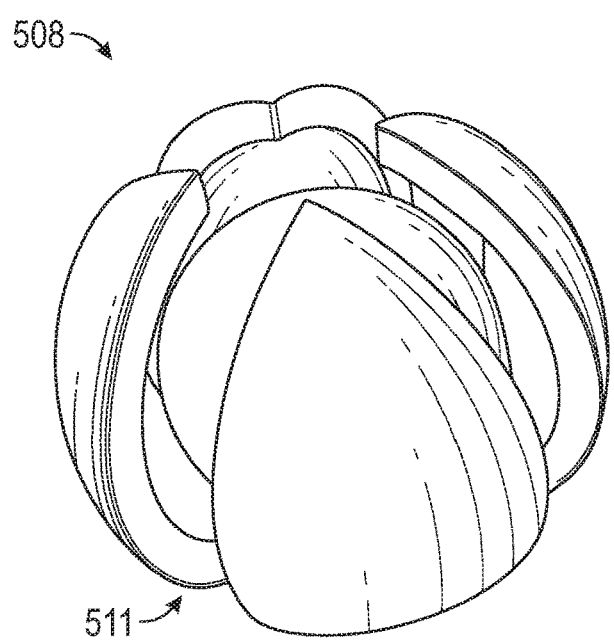
FIG. 11 is a perspective view of an exemplary embodiment of a ball antenna structure in accordance with the present disclosure.
Figure 12:
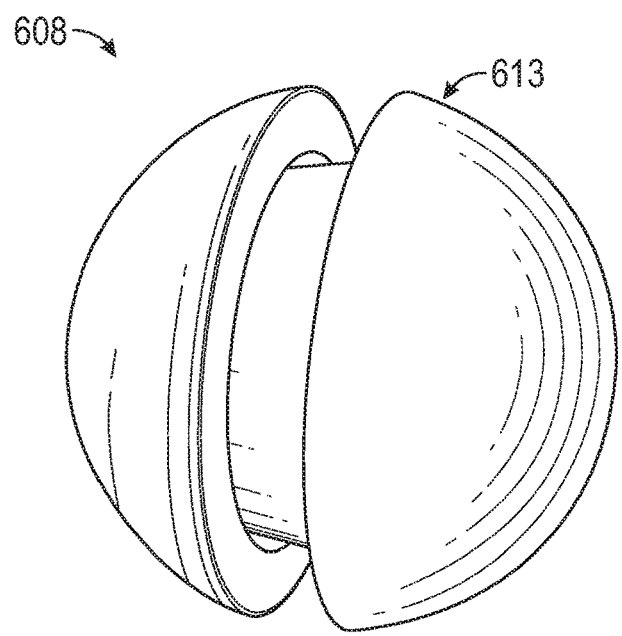
FIG. 12 is a perspective view of an exemplary embodiment of a ball antenna structure in accordance with the present disclosure.
Figure 13:
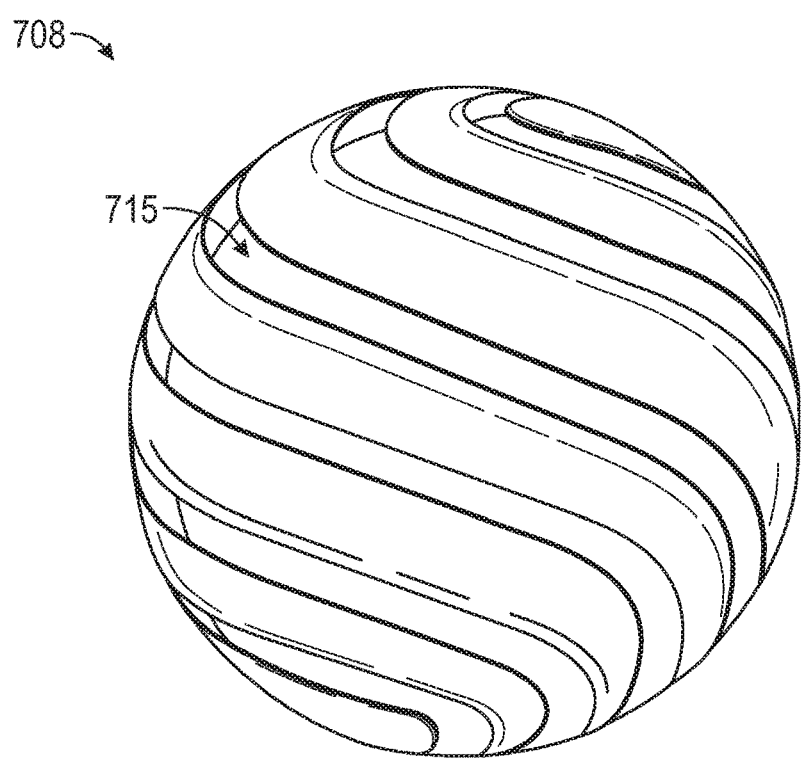
FIG. 13 is a perspective view of an exemplary embodiment of a ball antenna structure in accordance with the present disclosure.
Figure 14:
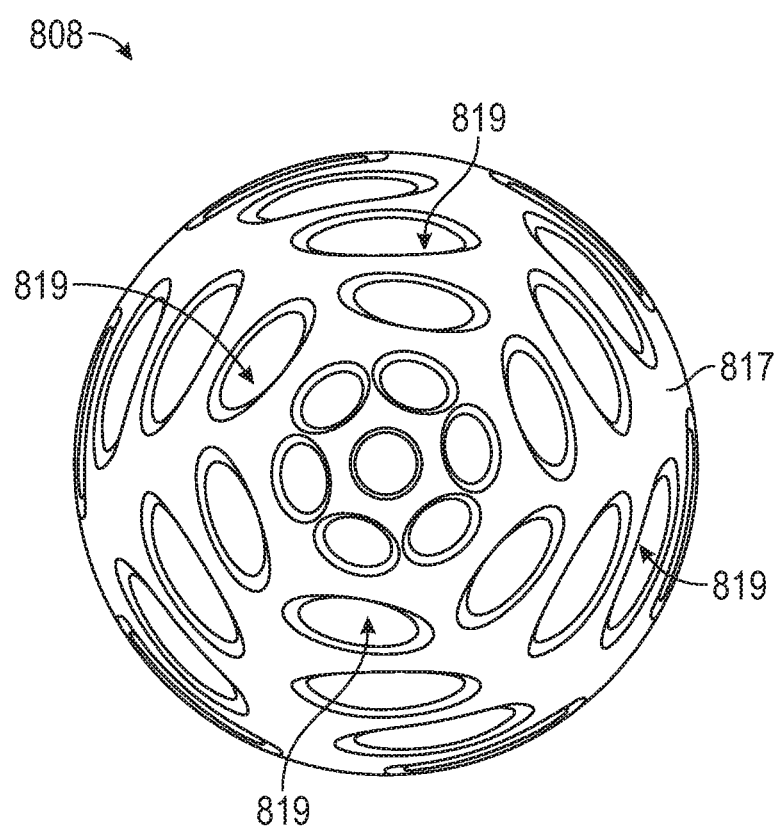
FIG. 14 is a perspective view of an exemplary embodiment of a ball antenna structure in accordance with the present disclosure.

Referring to FIGS. 10-14, disclosed ball structures may have a variety of designs including different types of enclosures, cuts, and cage elements. FIG. 10 shows an enclosed ball structure 408 that fits a higher wavelength range. More particularly, the ball structure 408 is enclosed by a basic lattice or cage 409. Another enclosed ball structure 508 is illustrated in FIG. 11. This ball structure 508 is enclosed by a partial four-piece shell 511 and fits a lower wavelength range. FIG. 12 illustrates another type of enclosed ball structure 608 having a two-piece shell 613. This type of structure fits a medium wavelength range. A "Cut Spiral" design in shown in FIG. 13 in which the ball structure 708 defines one or more spiral cuts 715 that extend around the ball. This type of design is efficient for relatively large distances and for convoluted antenna systems such as those used for long range radio transmissions. In FIG. 14, a "Caged Ball" antenna structure is shown. The ball structure 808 is contained within a cage 817 which defines a plurality of cuts 819 of various shapes and sizes. This type of structure is efficient for transmission deviations in unique locations such as under water, in caves, and in mines.

Figure 15:
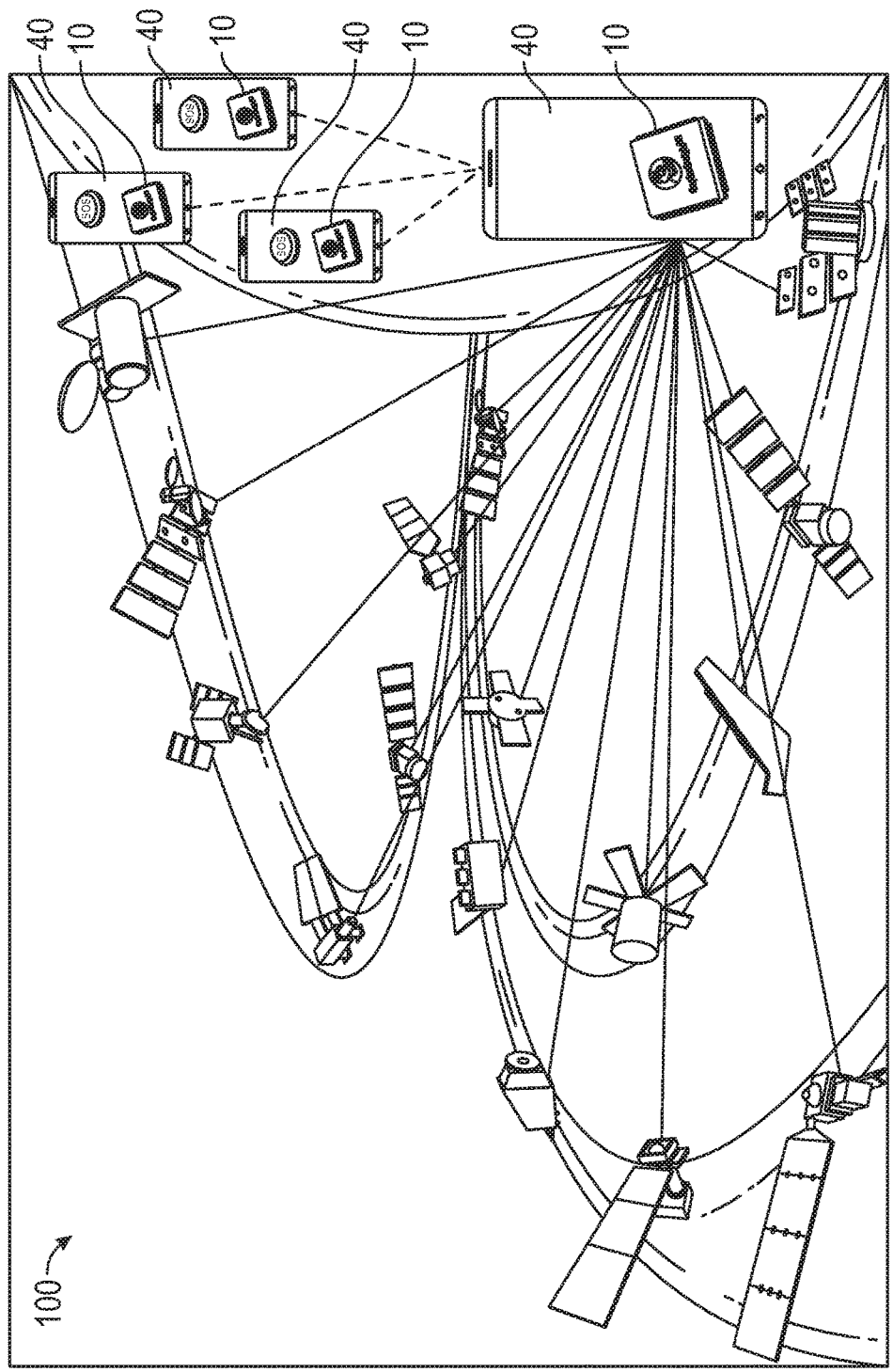
FIG. 15 is a perspective view of an exemplary embodiment of a communications system in accordance with the present disclosure.
Figure 16:
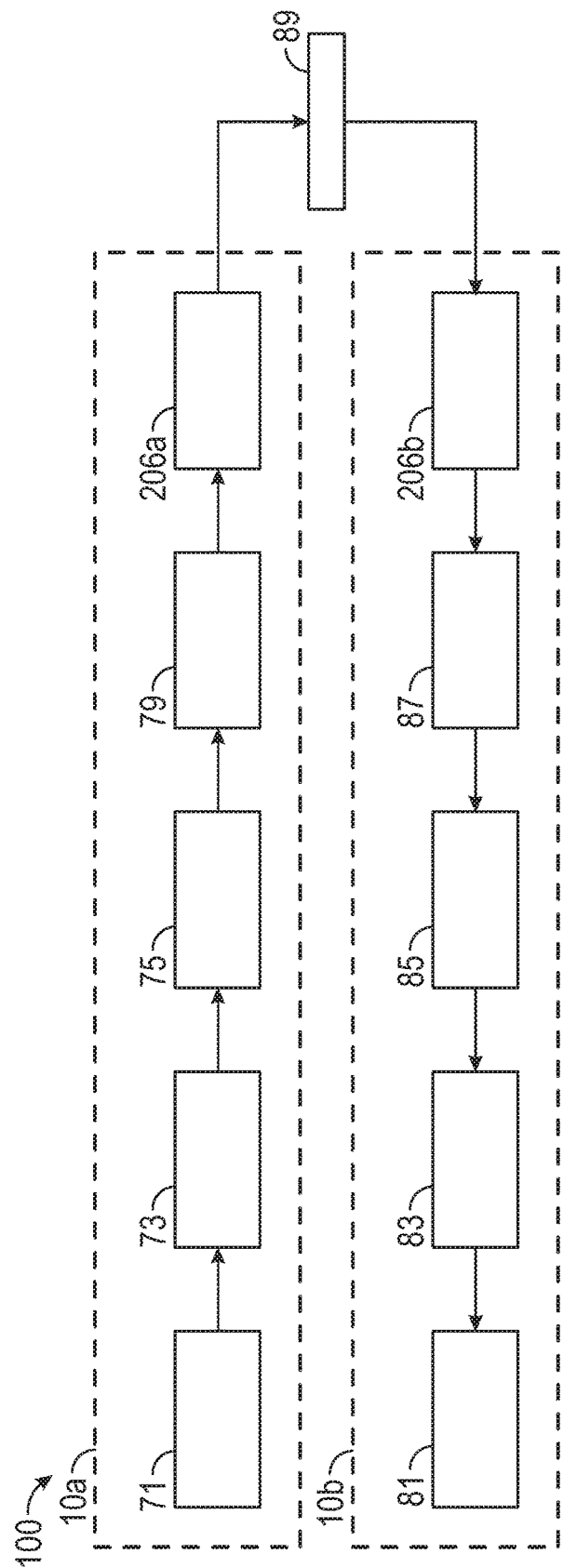
FIG. 16 is a schematic of an exemplary embodiment of a communications system in accordance with the present disclosure.

Turning to FIGS. 15 and 16, in exemplary embodiments an electronic circuit 10 forms an integral part of a communications system 100 comprising one or more personal computing devices 40. In exemplary systems, each personal computing device 40 houses an electronic circuit 10. More particularly, the electronic circuit or microchip 10 can be embedded within a mobile device's existing microchip or installed within a mobile device's electronic board, as an integral part of the system, and be configured to operate as a specific purpose electronic circuit or microchip. Alternatively, the electronic circuit or microchip 10 could be part of a complete, independent computer system within a mobile device. The personal computing device 40 could be one or more of a personal computer, a smartphone, a tablet computer, a PDM, a server, a cloud server array, a blade, a cluster, a supercomputer, a supercomputer array, and a game machine, and/or any other device with computing functionality. In FIG. 15, satellite communications are represented by solid lines and electronic circuit communications by dashed lines.

As shown in FIG. 16, a sender circuit 10a sends signals to a receiver circuit 10b via channel 89. The sub-blocks in the sender circuit 10a may include a source 71, a source encoder 73, a channel encoder 75, a modulator 77, and a transmitter antenna 206a. The sub-blocks in the receiver circuit 10b may include a destination 81, a source decoder 83, a channel decoder 85, a detector/modulator 87, and a receiver antenna 206b. In exemplary embodiments, the electronic circuit 10 works in conjunction with a smartphone software application. Field programmable gate arrays and other specific circuitry can be used to create and maintain a private, secured and encrypted network to provide analysis and heuristic based logic to work in conjunction with the mobile software application, enabling a powerful mechanism to provide personal assistance to users.

In exemplary embodiments, the electronic circuit or microchip 10 may also work with other electronic circuits and microchips, embedded within mobile devices, via private, encrypted, secured communication protocol, worldwide. More particularly, the electronic circuit and/or microchip 10 is connected to another electronic circuit and/or microchip 10, the connection between computers being made with the same hardware-based access barriers or firewalls including potentially any of the buses and on/off switches described herein to ensure private, secured and encrypted network, worldwide. This advantageously results in a private, secured, encrypted communication protocol established with all existing electronic circuits or microchips embedded within mobile devices, worldwide, creating a powerful computing system providing a wide variety of user benefits.

A secure control bus may be configured to work with the same electronic circuit or microchip 10 within other mobile devices, via a secured, private network. More particularly, the secure control bus may be configured to provide a connection to control at least a second firewall located on the periphery of the electronic circuit or microchip 10. In exemplary embodiments, the hardware-based access barriers or firewalls are used successively between an outer private unit, an intermediate more private unit, an innermost private unit, and the public unit (or units), with each private unit potentially being configured for a connection to a separate private network.

In exemplary embodiments, the electronic circuit or microchip 10 is configured to be securely controlled through a private network of computers. A secure control bus may be configured to connect a master controlling device with the public microprocessor located in the unprotected public unit or units. More particularly, the secure control bus may be configured such that it cannot be affected, interfered with, altered, read from or written to, or superseded by any part of said unprotected public unit or by input from the public network. The secure control bus is, however, able to receive input from the master controlling device, and the master controlling device provides secure control via the secure control bus.

In exemplary embodiments, the master controlling device controls the private unit or units through the private network of computers by the additional and separate private network connection in the secure private unit or units and via the secure control bus. More particularly, the secure control bus may provide and ensure direct preemptive control by the master controlling device over the private microprocessor, core or processing unit. A secondary controller may also be used to control the private unit. In addition, the master controlling device may be configured to securely control the operations of the public microprocessor. In exemplary embodiments, one or more secondary controllers may be used to control the public microprocessor located in the unprotected public unit. The secondary controllers may be integrated with or located in the public microprocessor in the public unit. The electronic circuit 10 may also have an energy storage unit on it. In exemplary embodiments, the energy storage unit is a metal capacitor, though any type of energy storage unit could be used. As discussed in detail herein, the capacitor can store power for an SoS beacon pulse as part of tracking system 300.

Advantageously, exemplary systems incorporating disclosed electronic circuits can provide a wide variety of functions. For example, in exemplary embodiments a self-diagnostic system is provided to forecast and detect possible internal malfunction of the electronic circuit and other parts of the personal computing device and warn the user of the malfunction. The self-diagnostic system could automatically switch to a redundant system to avoid cessation of operations of the device. By the same token, exemplary embodiments have a power disconnect feature to disconnect the power supplies to the microprocessor or other parts of the device, causing the entire personal computing device to permanently cease operations.

Figure 17:
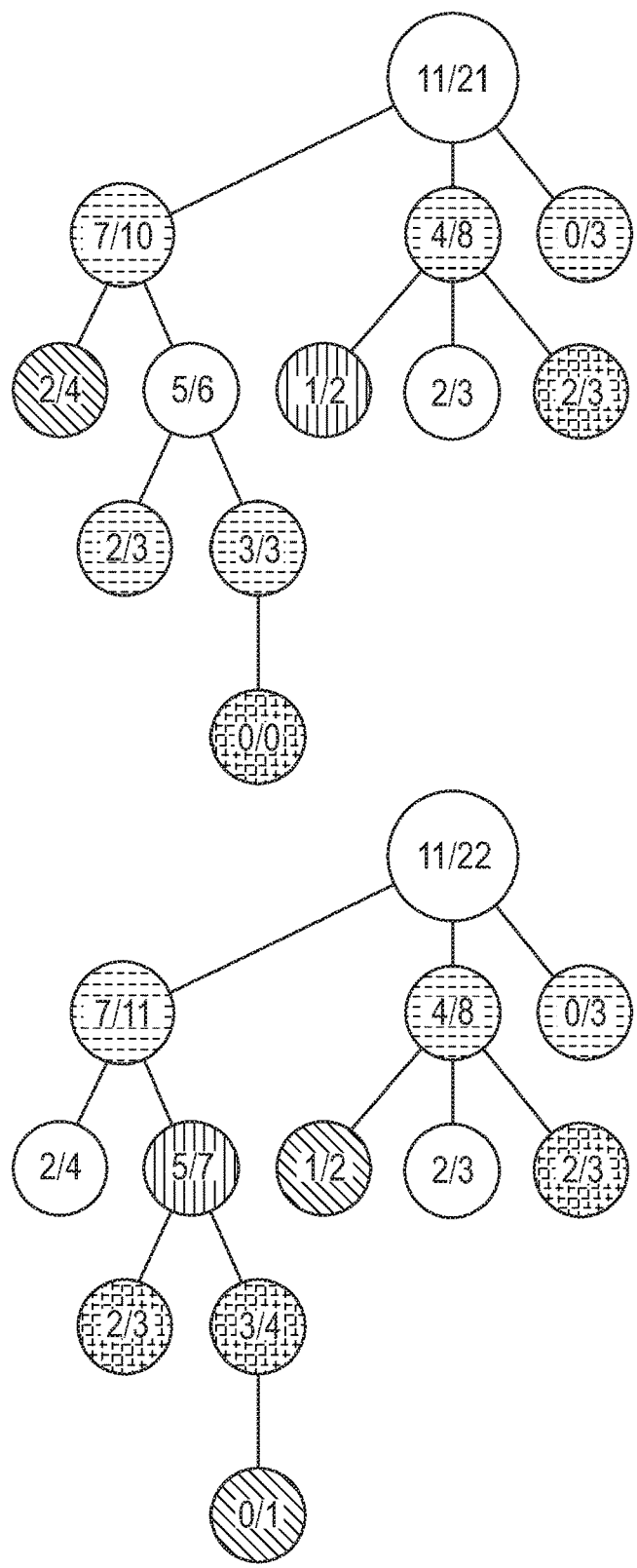
FIG. 17 is a schematic of an exemplary embodiment of a heuristics-based power management system and method in accordance with the present disclosure.
Figure 18:
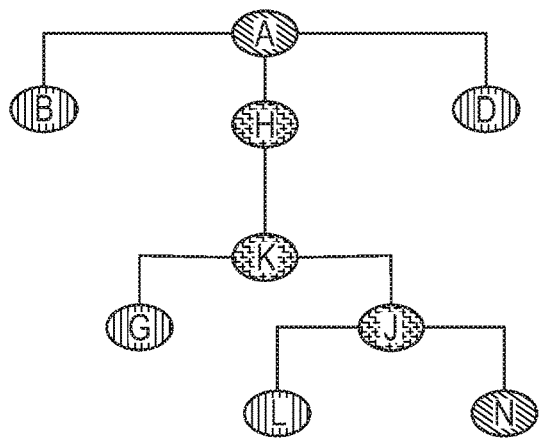
FIG. 18 is a schematic of an exemplary embodiment of a heuristics-based power management system and method in accordance with the present disclosure.

Turning to FIGS. 17 and 18, exemplary embodiments provide Heuristic-based Power Management. As discussed above, exemplary electronic circuits comprise power manager 43 to automatically control the unit's power. More particularly, disclosed devices and methods feature a power management system based on a smart heuristic. The electronics within tracking device 200 work with their own rule-set, but are not limited to these rules. As the heuristic machine language software operates on the tracking device, in conjunction with its smartphone app, it becomes key to prolonging the device's battery life. The disclosed Power Heuristic monitors physical conditions (temperature, humidity, altitude, etc.) and their effect on power consumption. Each of these factors is measured and "learned" to adjust the entire system power management, which conserves and maximizes power source life.

In exemplary embodiments, the tracking device and system target is to be fully operational for a period of at least one year, and as a living entity, it constantly learns about conditions and adjusts its power to continue operation. Furthermore, the tracking device and system decides which sub-systems will be shut off for a period to conserve energy. The embedded heuristic is constantly learning and executing conclusions to operate longer. It can be compared to the human brain, which is constantly expanding knowledge and computing power to perform complicated tasks.

Exemplary tracking devices and methods have advanced Power Heuristic analyzer circuits that cycle through instructions before passing decisions to main sub-circuits. Utilizing the microprocessor for execution, they allow maximum power conservation. The tracking device's smart Power Heuristic even puts itself to sleep occasionally to conserve power.

One important aspect of power analysis validation is power consumption estimation and optimization. To handle these tasks, the heuristic uses a range of search-tree-based analyses. The complexity of tasks in general is examined by studying the most relevant computational resources, such as execution time and space. Ranging problems that are solvable within a given amount of time and space into well-defined classes is a very intricate task, but it can help enormously to save time and to improve the overall system's performance, which in this case is efficient power management. Crucially, the heuristic has its own self-checking mechanism to verify that even if a shortcut decision is taken, it is viable and performing its task efficiently. Advantageously, exemplary tracking devices' and methods' unique heuristic circuitry, or "wisdom," combined with the related mobile app, create an efficient power management system to ensure long power life.

In FIG. 17, a schematic illustrating an exemplary smart power heuristic, the vertical lines sequences are active-power-consumption operations, the cross-hatch are power-retention-mode operations (Listening), and the diagonal lines are sleeping. The Power Management Heuristic ensures essential sub-circuit operations, listeners, and sleeping units according to physical conditions and operational necessities. FIG. 18 shows an exemplary tracking device's operative, listening and sleeping sub-circuits in its software heuristic.

Figure 19:
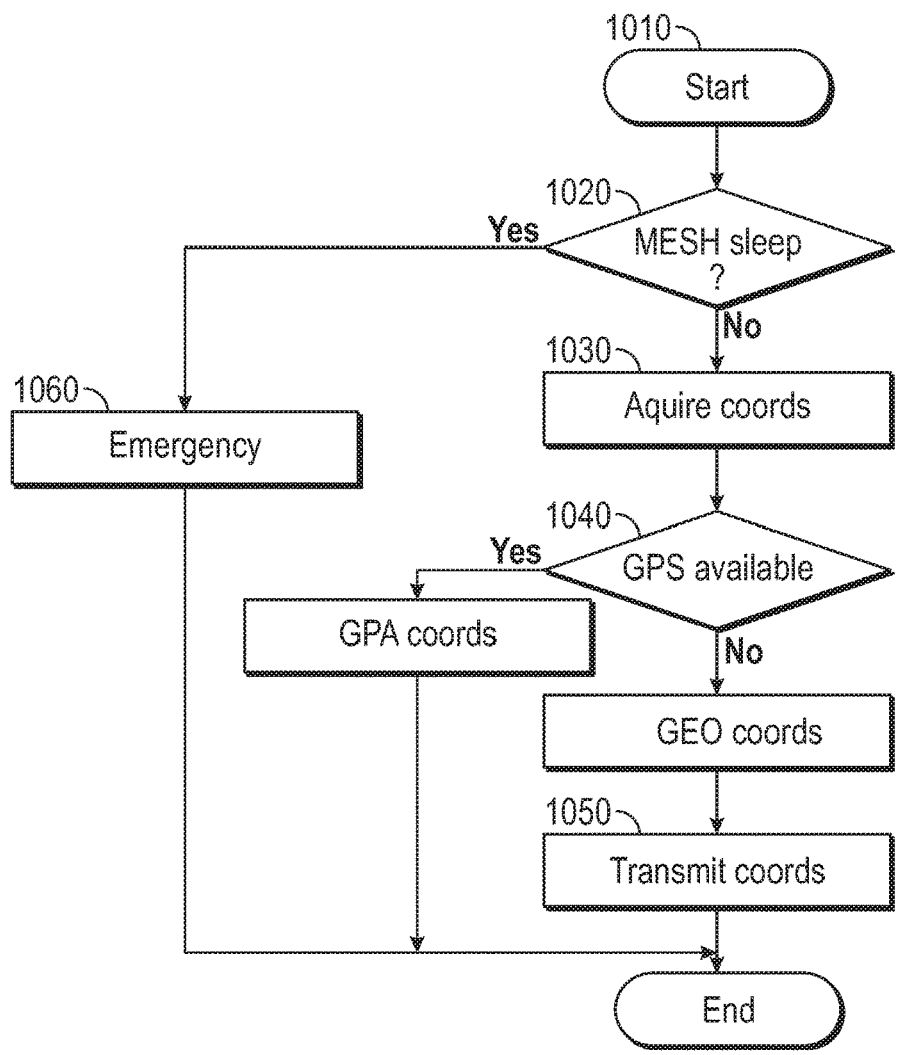
FIG. 19 is a schematic of an exemplary embodiment of a tracking method in accordance with the present disclosure.
Figure 20:
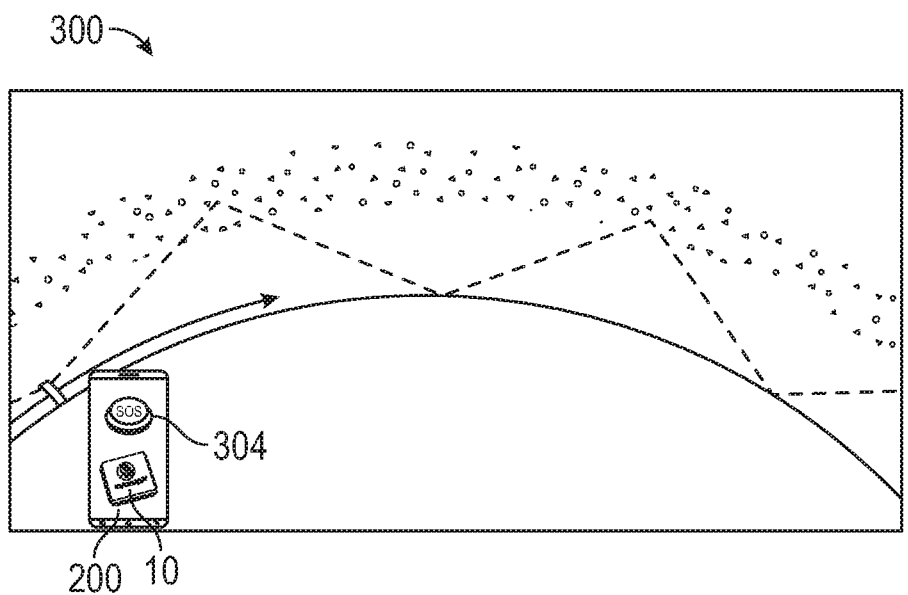
FIG. 20 is a perspective view of an exemplary embodiment of a tracking method in accordance with the present disclosure.

In operation, shown in FIGS. 19 and 20, a user affixes a tracking device 200 to an object by pressing the package 202 to the object to be tracked so the sticky outer surface of the package 202 adheres to a surface of the object. The object could be anything of value to the user such as a vehicle, a mobile phone or other mobile device, a personal computing device, or even a person's clothing such that the person's location can be tracked. Users can enter the affixed object's details as a numeric/alphanumeric identification code. For example, for vehicle identification, the vehicle's VIN number, license plate, owner information, or any other designated identification code, may be entered. This information is stored in the electronic circuit's volatile memory.

Upon affixing the tracking device 200 to the object, the circuit is turned on and starts tracking 1010. The tracking device may temporarily enter sleep mode 1020. The tracking device acquires its coordinates 1030. From then on, the electronic circuit will transmit an identification signal through GPS, if available 1040, or short-wave at certain time periods. From its location on the object, the tracking device 200 may also transmit signals regarding its coordinates 1050 via broadband from its antenna 206. As discussed in more detail herein, even without broadband the tracking device can transmit signals to enable tracking of the device's (and the object's) geographical location anywhere on Earth via satellite or short waves. In exemplary embodiments, the tracking device 200 also transmits in a sweep mode, hopping between frequencies to avoid interference. If the object is stolen or the user loses the object, the user will be able to pinpoint the exact location of the object by receiving the signals transmitted by the tracking device 200 at any personal computing device or any instrument equipped with GPS or other locational systems. The signals could display the location of the tracking device 200 (and the object) on mapping systems such as Google maps.

In exemplary embodiments, the short-wave, other frequency due to sweep method (Frequency hopping), or GPS signal is received by a transceiver 328 that is connected to a server with control software. The serial number of the tracking device 200 is identified and its location may be sent to the user's mobile app via conventional cellular network or through a website. Users can request the location of their tracking device at any time. A signal is then sent through GPS or short-wave to the tracking device. Upon receiving the signal, the tracking device acknowledges the request and sends its current location. The software can assemble a visual map of the tracking device's progress.

In the event of an emergency 1060, the user can send an emergency signal by removing the tracking device 200 from the object. More particularly, the user pulls the package 202 off the object so the sticky surface peels off from the surface of the object. The removal of the tracking device 200 from the object triggers the affix sensor 204, which is configured to determine whether the tracking device 200 is affixed to the object. When the tracking device 200 is removed from the object, the affix sensor 204 advantageously senses the removal and sends a signal identifying the exact location of the object (and the user). This signal can be received by a friend or family of the user and/or police departments or other authorities to alert them that the user is in an emergency situation and provide them with the user's exact location. In an exemplary embodiment, if the tracking device 200 is removed before "end-of-life," a sensor system turns on an emergency SOS transmission, alerting the user via the mobile app. The SOS transmits the device's location until battery power is exhausted. Exemplary embodiments of a tracking system 300 are discussed in more detail herein.

Figure 21:
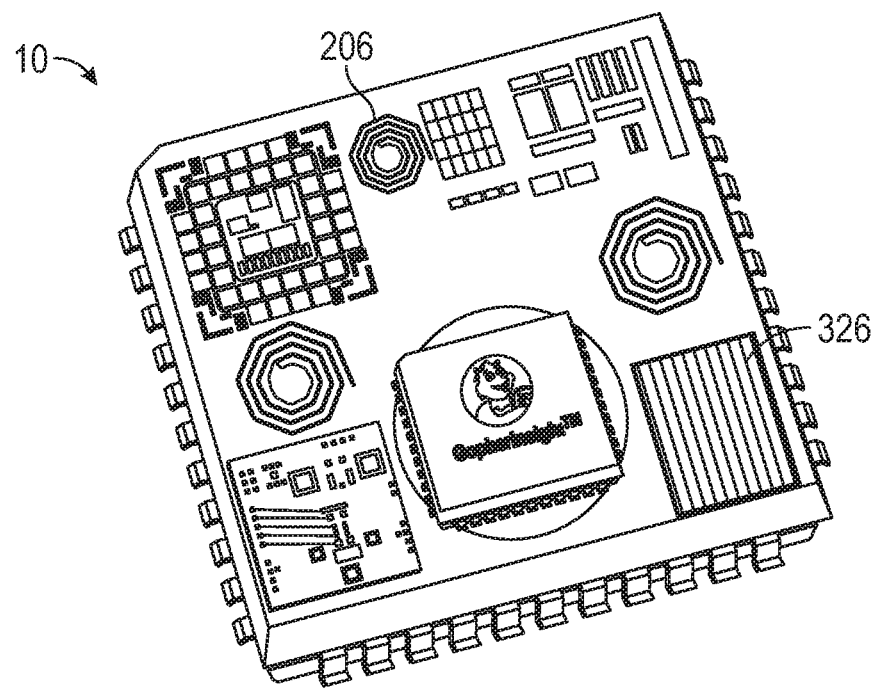
FIG. 21 is a perspective view of an exemplary embodiment of an electronic circuit in accordance with the present disclosure.
Figure 22:
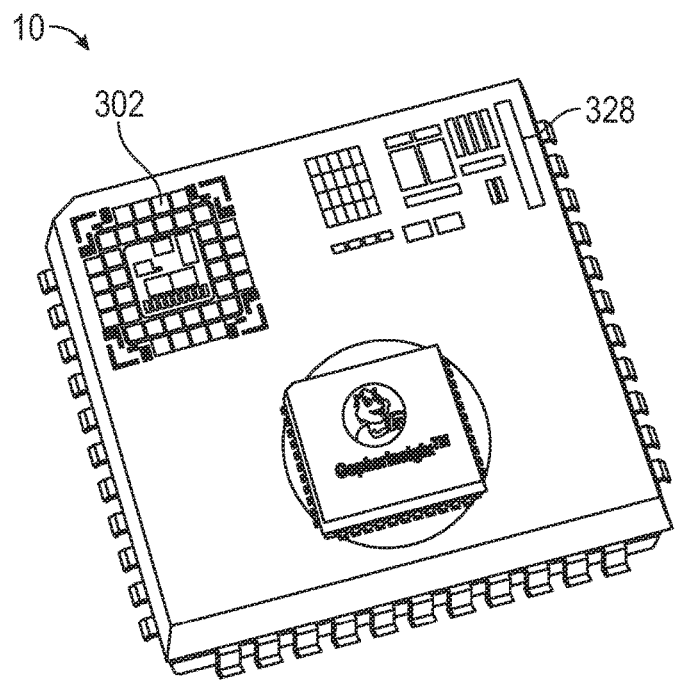
FIG. 22 is a s perspective view of an exemplary embodiment of an electronic circuit in accordance with the present disclosure.

Turning to FIGS. 19-24, an exemplary tracking system will now be described in more detail. In exemplary embodiments, tracking system 300 is communicatively connected to the tracking device 200 and, in particular, to electronic circuit 10. As discussed above, the electronic circuit 10 is embedded within the patch package 202. As best seen in FIG. 22, an emergency unit 302 may be located on the electronic circuit 10. The tracking system 300 may comprise systems, methods and computer software for purposes of emergency communication, beacon, location identification, tracking, and transmission of a user's medical vital signs status on personal computing devices, in real time. In exemplary embodiments, the system 300 tracks and identifies the location of each tracking device 200 in the system, including its location, status and global position in any type of terrain and landscape, world-wide.

During ordinary operation, the tracking system 300 may communicate within a defined operation envelope defining a permissible working relationship and communication link with the tracking device 200. The system 300 responds to interruption of the communications link with the tracking device 200 and continues the emergency transmission using the electronic circuit's circuitry, via satellite or short waves. The system 300 can track device malfunction and continue emergency satellite transmission using the electronic circuit and/or a capacitor power unit, as described herein.

Signals can be sent over personal computing devices using electronic circuits 10 and a mobile software application that work together to identify the location of the tracking device 200. The tracking systems 300 may be configured to determine the best, shortest route to reach the user/trackee using a combination of tracking points and display the determined route on the graphical user interface associated with the user's tracking device 200.

In exemplary embodiments, the tracking system 300 records a user's personal information including medical data. More particularly, the system 300 records personal identification features such as the user's fingerprint and eye print. The user can enter his/her medical information and the system 300 is configured to transmit vital signs status in real time to a central emergency server. The system may measure the user's vital data using the mobile device health sensor and/or via the application software. In these instances, the user's medical information and vital signs status may be transmitted to a remote center for assessment by one or more medical professionals.

The tracking system 300 enables GPS based emergency communication and location tracking. More particularly, the system 300 enables tracking of the user's tracking device 200 via a unique sequence code that is assembled within the electronic circuit 10. The system may communicate directly with a satellite network and can work in areas that are out of cellular/wireless range. In exemplary embodiments, the system 300 includes an SOS button 304, as shown in FIG. 20. When the SOS button is activated, an emergency sequence for location and tracking is activated and launched.

The emergency sequence may include transmission of a private emergency signal, in the form of an encrypted, secure private code sequence (e.g., 1024-bit encryption protocol) to avoid data breach, to the electronic circuits 10 of other personal computing devices 40 in the area and to the central emergency server every designated time period. The code starts the emergency procedure. In addition, the code may identify the location of the tracking device 200. The transmission may be done via a GPS system and/or via the proprietary microchip protocol.

In exemplary embodiments, a distress signal is transmitted to other electronic circuits 10 within other tracking devices 200, worldwide, to increase its power and transfer to the main emergency server in a central location. In exemplary embodiments, the system identifies the mobile device location (latitude and longitude), and, as best seen in FIG. 20, transmits this information via sky waves (represented by dashed lines), and/or even through the ionosphere (represented by the layer of various shapes) to be received by other electronic circuits 10. The closest electronic circuit 10 that receives the information passes it on through regular network ground waves (represented by the solid line and arrow), such as the internet. In this way, a tracking device user can be located worldwide, without any cellular/internet services. In exemplary embodiments, the signals can be monitored worldwide and the location of the distress detected by non-geostationary satellites. The user can be located by some combination of GPS trilateration and Doppler triangulation.

Figure 23A:
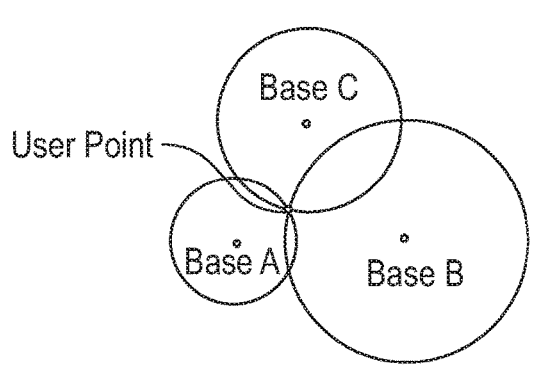
FIG. 23A is a schematic of an exemplary triangulation method in accordance with the present disclosure.
Figure 23B:
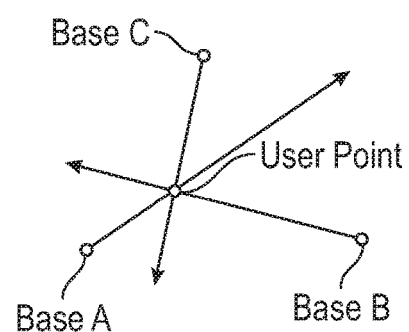
FIG. 23B is a schematic of an exemplary triangulation method in accordance with the present disclosure.
Figure 24:
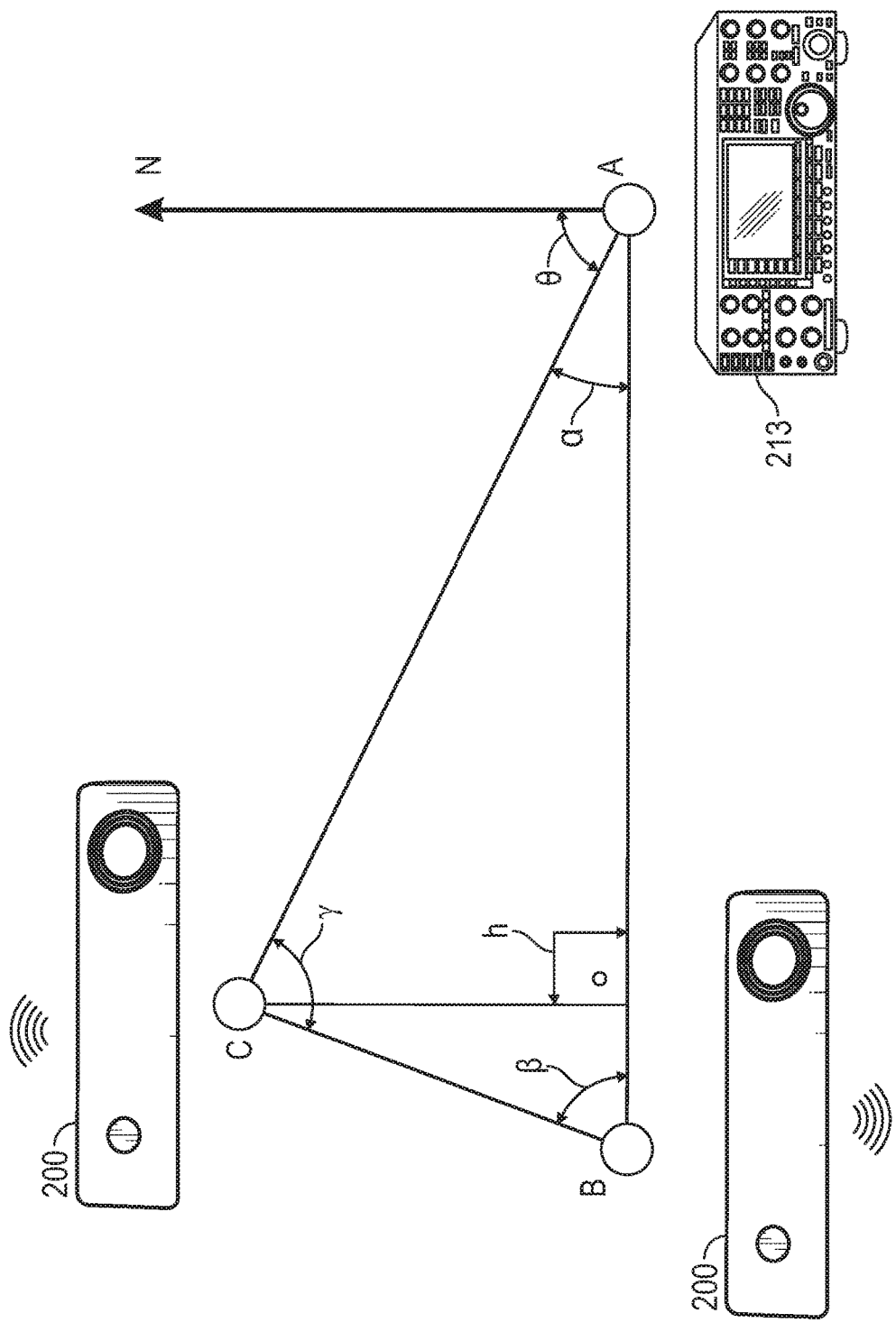
FIG. 24 is a schematic of an exemplary triangulation method in accordance with the present disclosure.

With reference to FIGS. 23 and 24, it can be seen that disclosed tracking devices and methods can work in conjunction with the static base unit hardware and software to accurately calculate the tracking device's geographical location, without any GPS information. An advanced software executed within the static base unit analyzes the tracking device's transmission and information. Based on triangulation and advanced mathematics calculations, computer software provides an exact location of the tracking devices without GPS data. Advantageously, this advanced radio triangulation system is extremely effective, providing long range communications and the ability to penetrate water and rocks. It has significant advantages over GPS communication, which is blocked by many solid objects. Exemplary radio systems advantageously enable communication with underwater objects and inside mines and caves.

In an exemplary triangulation method, geometric knowledge is used to obtain a user's location, either by the distance to the fixed known measurement points or the received signal angle. FIG. 23 illustrates how to get the location of a user through distance and angle information. Bases A, B, and C—three fixed wireless beacon stations in known positions—are shown. In A, if the distance of the user point to all three base stations is known, the location of the user point can be expressed as the intersection of three circles. For B, if the angle of the base stations to the user point or the angle of the user point to the base stations is known, the location of the user point can be obtained by the intersection of three vectors. The only problem left is how to get the distance or angle from the user point to the base points.

AOA (Angle-of-arrive) is a method of getting the angle of a received signal from known stations to get the user position. The angle of signal can be retrieved if the user's tracking device and beacon stations use directional antenna technology. However, the angle of stations might not always be the angle of received single because of multi-path. Time-based triangulation uses distance to determine location. It assumes that the time used from beacon to user can be used to infer the distance between the two points, as the signal travels at near the speed of light. Time based-triangulation uses two methods: ToA (Time of Arrive) and TDoA (Time Difference of Arrive).

The ToA method directly measures the time a packet used to transmit from user device to beacon station—or vice versa. The user's tracking device can transmit a packet with a timestamp. The beacon can obtain the time of arrival, hence get the time for traveling. However, this method assumes that the time at the beacon station and user device is the same. To satisfy this assumption, the stations and user device must precisely synchronize their time, which is very hard to achieve.

TDoA is similar to ToA, however it only requires beacons to synchronize their time. Even if the transmission time is unknown, the beacons can have different hyperbolic curves for the potential locations for different assumed transmission times. We can assume different hyperbolic curves for different assumed transmission times, and the curves' intersection at a single point should be the correct transmission time. The point specifies the possible locations.

Beside the time, the property of a received signal is also an important way to infer distance. In most of the literature, RSS is used to represent received signal property. The propagation power-loss model has characterized fading signal strength over long distances. In reverse, the distance can be obtained by the strength of the received signal. In a ZigBee network, LQI is regarded equivalent to RSS. LQI indicates the strength and data quality of link in IEEE 802.15.4. It is measured for every packet and is represented as an integer from 0 to 255.

An exemplary triangulation method has also been extended to multilateration in which there are more than three stations used to locate user position. Multilateration can combine any three stations to get the predicted result and use different measurements to weight the result and get the ultimate position. When triangulation is considered, the beacon stations and the user need to be in line-of-sight. Otherwise, the angle or distance referred from time or RSS cannot used to locate the user. However, in a real-world scenario, there might be walls, doors, rooms, and hallways in a building. Even if in a plaza, there might be furniture, statues, fountains, or pedestrians blocking the line-of-sight. In exemplary embodiments, the disclosed system works as a relay-based system. Each device functions as a repeater and passes on the device's transmissions.

Figure 25:
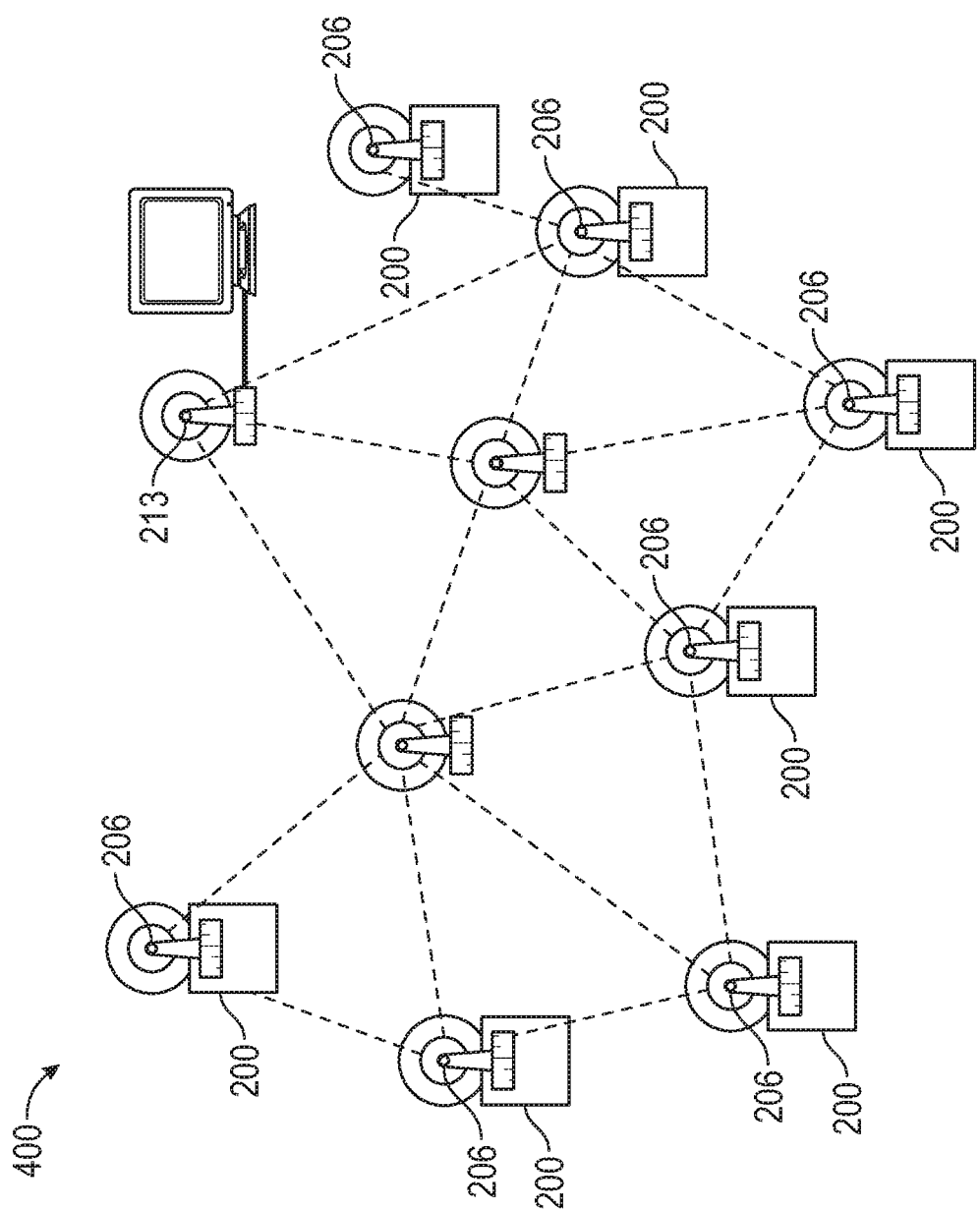
FIG. 25 is a schematic of an exemplary embodiment of a mesh network in accordance with the present disclosure.

Referring to FIG. 25, in exemplary embodiments tracking devices can communicate via a mesh network 400 controlled by a unique process to manage "listening" time of the tracking device 200. This methodology is an evolutionary-based process that manages and controls each tracking device's "listening" time to participate in the mesh. Unlike a typical mesh where all components are constantly on, the disclosed mesh works with the tracking devices' and methods' smart-timing protocol. This protocol ensures "wakeup" and "go-to-sleep" calls to efficiently manage system power and mesh operation.

Exemplary tracking devices work together via a private, secured communication protocol. Ensuring confidentiality and privacy, every tracking device 200 affixed to an object communicates with other units over a private network, creating enormous computing and database power worldwide. Once a tracking device sends a transmission, the closest tracking device receives it and passes it on to others, until the transmission reaches the main static transceiver 213. In this way, transmissions are passed on faster all the way to the main transceiver unit 213, and from there through conventional networks to the user's mobile app. The combination of millions of units, worldwide, provides the best coverage and fastest response.

Returning to the emergency tracking system 300, as the emergency procedure starts, the system 300 may put the user's tracking device 200 on power saving mode to maximize battery life. In exemplary embodiments, the system switches to a proprietary lowest power consumption mode upon SOS button activation. In addition, as best seen in FIG. 21, the tracking system may have a capacitor 326 that is within the electronic circuit 10 and the capacitor may hold energy for extra use after the battery power is exhausted. The system 300 may disable most of the features of the tracking device 200, keeping only the necessary features, or may disable the entire device. From that moment on, the tracking system 300 controls every power related operation within the tracking device 200.

In exemplary embodiments, the tracking system 300 detects battery exhaustion time and provides certain operations accordingly. For example, within a certain time period before the battery power runs out, the system 300 transmits the last location of the tracking device 200 and a forecasted location in the next few hours, based on the movement that was done for the past few hours. Thus, the system may send a last GPS location signal to other electronic circuits 10 to be transferred to the central emergency server. When the tracking device 200 is being shut off for any reason, including when the battery is dying, a fraction of a second before shut off the electronic circuit 10 sends a last pulse containing the latitude and longitude information of the device. It can also transmit the latitude and longitude during each SoS interval that can last for a few days. The system also may offer a text messaging feature during low battery period so the user can communicate via text with an emergency control center, a rescue team, or other rescue services. The battery source can also be fixed, replaceable, and/or rechargeable using a micro USB socket.

Figure 26:
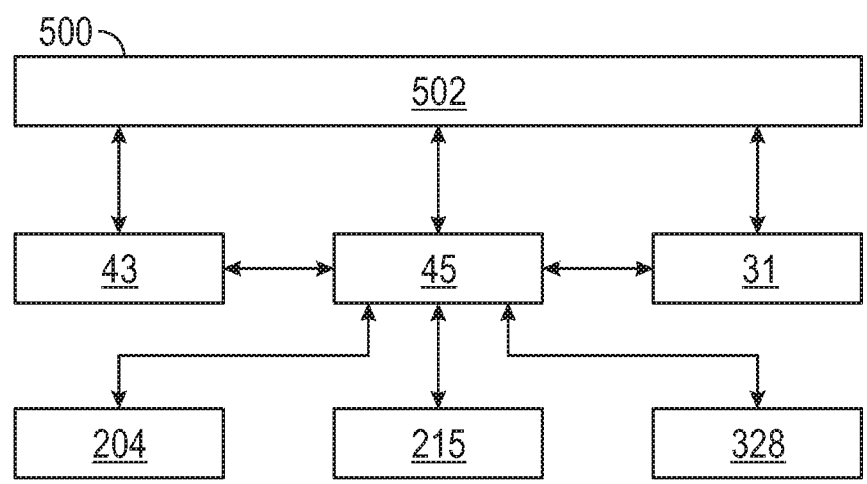
FIG. 26 is a schematic of an exemplary embodiment of an energy harvesting system in accordance with the present disclosure.

Furthermore, as illustrated in FIG. 26, exemplary embodiments employ energy harvesting to provide power for tracking devices 200, including a GPS receiver 215, and the emergency tracking systems 300. Energy harvesting is the process of capturing and accumulating byproduct energy as the energy becomes available, storing the energy for a period of time, and conditioning it into a form that can be used later, such as operating a microprocessor within its limits. Energy harvesting is particularly well-suited for low-voltage and low-power applications and applications that require a back-up battery, especially if the battery is in a remote or difficult to reach location.

Energy-harvesting opportunities are enabled by exemplary electronic circuits 10 discussed above, which can capture and store small energy packets and channel them into useful purposes. The energy management provided by the electronic circuits 10 includes high energy efficiency to capture and accumulate small energy packets, high energy retention to store the energy for long periods, and the proper energy conditioning to perform the desired task. The energy management is well-defined and tolerates a wide range of voltage, current, and waveform inputs, including over-voltage, overcharge, and other irregular input conditions.

Exemplary embodiments may use one or more of the following devices, materials, or sensors to convert wasted energy into electrical voltages and currents: piezoelectric (PZT) crystals or fiber composites, solar photovoltaic cells, thermoelectric generators (TEGs), and electromagnetic inductor coils. Exemplary embodiments will use energy-harvesting devices designed to capture the available power, manage it, and communicate handshake instructions to compatible wireless sensor systems. Disclosed energy harvesting systems and methods enable capture, storage (in a capacitor, super-capacitor or battery), and management with high retention efficiency.

Capturing, accumulating, and storing small packets of electrical energy requires high efficiency. Accordingly, electronic circuit 10 can stay in the active mode and be ready to capture harvestable energy. The tracking device may be ready to provide an output as the application design requires it. For example, for a vibration-energy source with a circuit, a temperature sensor 209, and wireless transmitter, efficiency must be high; the energy consumed must be less than the energy from vibration.

An exemplary high-efficiency energy harvesting system 500 is shown in FIG. 26. It comprises an energy generator, capture/storage/management electronics, and a load designed to be powered by the harvester 502—typically a wireless sensor network. In an exemplary embodiment, a piezoelectric crystal membrane may be the energy generator. The piezoelectric generator transforms mechanical vibrations, strain, or stress into electrical current. This mechanical strain can come from many different sources, including human motion, other low-frequency seismic vibrations, aircraft or vessel vibrations, and acoustic noise. In exemplary embodiments, the piezoelectric effect operates in alternating current, requiring time-varying inputs at mechanical resonance to be considered most efficient at generating energy. Most piezoelectric sources produce very high voltage but extremely low current, resulting in available power on the order of micro-watts—too small for most system applications, but an ideal source for energy-harvesting electronics.

AC energy from the PZT may be channeled into the detector, which converts the voltage to DC and initiates the capture-and-storage operation. The detector can accept instantaneous input voltages ranging from 0.0V to +/−500V AC, and input currents from 200 nA to 400 mA, in either a steady stream of pulses or in an intermittent and irregular manner with varying source impedances. As the source injects energy into the detector electronics, electrical impulses are collected, accumulated, and stored on an internal device such as a capacitor. The capture mechanism is set to operate between two supply voltage thresholds—+V_low DC and +V_high DC—corresponding to the minimum (VL) and maximum (VH) supply voltage values for the intended "load" application. When (VH) is achieved, the output is switched to "on demand" to power the load. As the output diminishes and falls to (VL), the output is turned off and the charging cycle begins again until it reaches (VH). In one example, typical charge/cycle times are within four minutes, at an average input current of 10 uA, and within 40 minutes at an average input current of just 1.0 uA.

For optimal performance and energy retention, designing these energy-harvesting electronics may incorporate micro-power devices so the energy consumed by the harvesting electronics is much smaller than the energy sent by the generating source. The net captured energy is a direct function of energy available for capture minus the energy the circuit must consume to stay in active mode.

A second key component of energy management is storage and retention with minimal leakage or loss. In certain scenarios, when automobile traffic and vibration are minimized, there may be extended intervals before sufficient energy has been captured and stored. Therefore, the harvester's electronic design must possess extremely high retention when the energy-generator function is randomly available or interrupted for long periods. Alternate energy generators such as solar or thermoelectric generators may also heighten available harvested energy.

With reference to FIG. 22, the system 300 may also include a short wave transceiver unit 328 located on the electronic circuit 10. In exemplary embodiments, the system may trigger a shortwave transmitter to transmit for longer time short wave radio signals. These signals are targeted to emergency receivers worldwide. In exemplary embodiments, the system 300 has a self-adjustment short wave adjustment system to adjust the short wave transmission, achieving maximum efficiency, during terrain change and/or battery life condition. The transmitter is activated when the battery's energy is completely drained.

In exemplary embodiments, the high frequency RF circuitry, including an RF antenna 206 on the electronic circuit 10, as shown in FIG. 21, is designed to operate for few more days using the metal capacitor's energy. More particularly, the electronic circuit 10 continues to transmit short wave pulses after the main battery power is exhausted, providing a few more days of GPS location identification transmission. In addition, based on the battery power remaining, the system may adjust the emergency transmission pulse, creating longer intervals, to extend the emergency transmission time. In exemplary embodiments, the frequencies of the short wave signals are automatically adjusted by the electronic circuit to be in the range of few to hundreds of Megahertz, according to the topographic and landscape in order to reach longer distances.

As mentioned above, the capacitor 326 stores power to enable an SoS beacon pulse every few minutes for a few days or up to about a week of emergency beacon, even after the battery in the tracking device 200 is exhausted. In exemplary embodiments, each pulse contains latitude and longitude information of the tracking device 200, user name, phone ID and additional information about the user's condition. It should be noted, however, that the capacitor does not kick into work only after the battery is dead. As the battery is still live the user can enter his medical condition and status via text message. This text can be coded and transmitted with the other information in the pulse mentioned above. The advantageous result is a beacon pulse that is transmitted every few minutes about the location and status of the user. Once this pulse reaches other electronic circuits 10 on other personal computing devices 40, it transfers the emergency signal through a regular network, between the electronic circuits 10. The phone company/users will receive an alert about an emergency condition akin to amber alerts.

Thus, it is seen that global tracking devices, systems, and methods are provided which allow emergency location and tracking ability. It should be understood that any of the foregoing configurations and specialized components or connections may be interchangeably used with any of the systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A tracking device comprising:
    a patch package made of a flexible material having a sticky outer surface enabling the tracking device to be affixed to an object;
    an electronic circuit housed in the patch package, the electronic circuit including:
        a controller;
        a secured basic input/output (BIOS) system;
        a memory unit
        a radio unit; and
        an antenna;
    a power source housed in the patch package; and
    at least one sensor in communication with the electronic circuit;
    wherein the at least one sensor detects application of the tracking device to an object and automatically turns the tracking device on when the tracking device is affixed to an object; and
    wherein the electronic circuit transmits the location of the tracking device.

2. The tracking device of claim 1 wherein the at least one sensor is an affix sensor.

3. The tracking device of claim 1 wherein the at least one sensor comprises at least one pressure sensor and at least one conductivity sensor.

4. The tracking device of claim 1 wherein the electronic circuit further includes a process subsystem, a control block, a crypto-block, and an interconnect communicatively connecting the process subsystem to the control block and the crypto-block.

5. The tracking device of claim 1 wherein the antenna is a wire antenna.

6. The tracking device of claim 1 wherein the antenna is a ball antenna.

7. The tracking device of claim 6 wherein the ball antenna comprises at least one ball structure in a first plane.

8. The tracking device of claim 7 wherein the ball antenna further comprises a plurality of radiating elements in communication with the at least one ball structure, each of the plurality of radiating elements being located in a plane different than the first plane.

9. The tracking device of claim 8 wherein the ball antenna further comprises a plurality of ball structures in communication with the plurality of radiating elements.

10. The tracking device of claim 9 wherein the ball antenna further comprises a plurality of feed lines, each feed line connecting two or more of the plurality of radiating elements such that the plurality of radiating elements form a network fed by a common connection point.

11. The tracking device of claim 7 wherein the at least one ball structure comprises a plurality of ball structures encircling a centrally located ball structure.

12. The tracking device of claim 7 wherein the at least one ball structure defines a cut spiral structure.

13. The tracking device of claim 7 wherein the at least one ball structure has a cage structure.

14. A method of tracking an object, comprising:
    affixing a tracking device to an object by pressing the tracking device to the object so the tracking device adheres to a surface of the object when affixed to the object, the tracking device including:
        a patch package having a sticky material on an outer surface of the patch package;
        an electronic circuit embedded within the patch package, the electronic circuit including a controller, a secured basic input/output (BIOS) system, a memory unit, a radio unit, and an antenna;
        a power source embedded within the patch package; and
        at least one sensor in communication with the electronic circuit, the at least one sensor detecting application of the tracking device to the object and automatically turning the tracking device on when the tracking device is affixed to the object;
    receiving a transmission from the electronic circuit, the transmission providing location information of the tracking device.

15. The method of claim 14 wherein the electronic circuit further comprises an affix sensor.

16. The method of claim 14 further comprising receiving a transmission from the electronic circuit when the tracking device is removed from the object.

17. The method of claim 14 wherein the antenna is a wire antenna.

18. The method of claim 14 wherein the antenna is a ball antenna.

19. The method of claim 18 further comprising calculating a geographical location of the tracking device using triangulation.

20. A patch package comprising:
    a flexible material having a sticky outer surface such that pressing the sticky outer surface to an object causes the patch package to adhere to a surface of the object; and
    an electronic circuit housed in the patch package and being embedded within the flexible material;
    a power source housed in the patch package and being embedded within the flexible material; and
    at least one sensor housed in the patch package and being embedded within the flexible material;
    wherein the sensor detects application of the tracking device to an object and the tracking device automatically turns on when affixed to an object; and
    wherein the electronic circuit transmits the location of the patch package.

* * * * *